(12) United States Patent
Nystad et al.

(10) Patent No.: US 10,147,202 B2
(45) Date of Patent: Dec. 4, 2018

(54) METHODS OF AND APPARATUS FOR ENCODING AND DECODING DATA

(71) Applicant: ARM Limited, Cambridge (GB)

(72) Inventors: Jorn Nystad, Trondheim (NO); Anders Lassen, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 13/836,887

(22) Filed: Mar. 15, 2013

(65) Prior Publication Data

US 2014/0267283 A1  Sep. 18, 2014

(51) Int. Cl.
*G06T 9/00* (2006.01)

(52) U.S. Cl.
CPC ..................... *G06T 9/00* (2013.01)

(58) Field of Classification Search
None
See application file for complete search history.

(56) References Cited

U.S. PATENT DOCUMENTS

| | | | |
|---|---|---|---|
| 4,969,204 A | 11/1990 | Melnychuck | |
| 5,046,119 A | 9/1991 | Hoffert | |
| 5,047,853 A | 9/1991 | Hoffert | |
| 5,218,431 A * | 6/1993 | Gleicher et al. | 348/472 |
| 5,227,789 A | 7/1993 | Barry et al. | |
| 5,956,431 A | 9/1999 | Iourcha | |
| 6,298,169 B1 | 10/2001 | Guenter | |
| 6,738,058 B1 | 5/2004 | Gruber et al. | |
| 6,775,417 B2 | 8/2004 | Hong | |
| 6,937,250 B1 | 8/2005 | Schilling | |
| 6,940,511 B2 | 9/2005 | Akenine-Moller | |

(Continued)

FOREIGN PATENT DOCUMENTS

| | | |
|---|---|---|
| GB | 1517383 | 8/1975 |
| GB | 2348334 A | 9/2000 |

(Continued)

OTHER PUBLICATIONS

Office Action dated Apr. 30, 2014 in U.S. Appl. No. 13/464,663, 6 pages.

(Continued)

*Primary Examiner* — William A Beutel
(74) *Attorney, Agent, or Firm* — Vierra Magen Marcus LLP

(57) ABSTRACT

To encode a texture to be used in a graphics processing system, the texture is first downscaled to generate a lower resolution representation of the texture 41. An upscaled version 42 of the lower resolution version of the texture is then compared to the original texture to determine a set of difference values indicating for each texel the difference between the value of the texel in the upscaled version of the texture and in the original texture 43. An encoded texture data block is then generated for each 8×8 block of texels in the original texture 44. Each encoded texture data block contains a base color value taken from the lower resolution representation of the texture and a set of index values indicating the difference data from the determined set of difference data to be used when decoding the block of texture data to generate the data values to be used for the texture data elements that the block of texture data represents.

16 Claims, 6 Drawing Sheets

(56) References Cited

U.S. PATENT DOCUMENTS

| | | | |
|---|---|---|---|
| 7,242,811 | B2 | 7/2007 | Fenney |
| 7,734,105 | B2 | 6/2010 | Strom et al. |
| 7,983,498 | B1 | 7/2011 | Donovan |
| 8,102,402 | B2 | 1/2012 | Sorgard |
| 8,289,343 | B2 | 10/2012 | Sorgard |
| 8,605,104 | B1 | 12/2013 | McAllister et al. |
| 2003/0095596 | A1* | 5/2003 | Shimizu ............... 375/240.08 |
| 2003/0138152 | A1* | 7/2003 | Fenney ............... G06T 9/00 382/240 |
| 2003/0227462 | A1 | 12/2003 | Akenine-Moller |
| 2007/0127812 | A1* | 6/2007 | Strom ............... G06T 9/008 382/166 |
| 2009/0021521 | A1 | 1/2009 | Sorgard et al. |
| 2010/0046846 | A1* | 2/2010 | Brown ............... 382/233 |
| 2011/0007977 | A1 | 1/2011 | Amonou et al. |
| 2011/0148896 | A1 | 6/2011 | Lee |
| 2012/0106646 | A1 | 5/2012 | Cammas et al. |
| 2012/0281005 | A1 | 11/2012 | Nystad |
| 2012/0281006 | A1 | 11/2012 | Nystad |
| 2012/0281007 | A1 | 11/2012 | Nystad |
| 2012/0281925 | A1 | 11/2012 | Nystad |
| 2013/0142266 | A1 | 6/2013 | Strom et al. |
| 2014/0327668 | A1* | 11/2014 | Strom et al. ............... 345/419 |

FOREIGN PATENT DOCUMENTS

| | | |
|---|---|---|
| GB | 2423906 | 9/2006 |
| GB | 2439481 | 12/2007 |
| GB | 2445008 A | 6/2008 |
| GB | 2511629 A | 9/2014 |
| WO | WO1999022519 | 5/1999 |
| WO | 2003036984 A1 | 5/2003 |
| WO | WO2009/133860 | 4/2009 |

OTHER PUBLICATIONS

Office Action (Restriction) dated May 13, 2014 in U.S. Appl. No. 13/464,686, 6 pages.
Office Action (Restriction) dated May 13, 2014 in U.S. Appl. No. 13/464,696, 6 pages.
Response to Office Action (Restriction) filed Jun. 30, 2014 in U.S. Appl. No. 13/464,663, 13 pages.
Response to Office Action (Restriction) filed Jul. 14, 2014 in U.S. Appl. No. 13/464,686, 12 pages.
Response to Office Action (Restriction) filed Jul. 14, 2014 in U.S. Appl. No. 13/464,696, 17 pages.
Notice of Allowance dated Jul. 1, 2014 in U.S. Appl. No. 13/630,040, 11 pages.
Office Action dated Aug. 20, 2014 in U.S. Appl. No. 13/464,663, 24 pages.
Office Action dated Sep. 18, 2014 in U.S. Appl. No. 13/464,686, 29 pages.
Office Action dated Sep. 18, 2014 in U.S. Appl. No. 13/464,696, 24 pages.
Office Action dated Oct. 9, 2014 in U.S. Appl. No. 13/933,604, 19 pages.
Combined Search and Examination Report dated Sep. 25, 2014 in GB patent application No. 1404642.9, 7 pages.
Response to Office Action filed Nov. 20, 2014 in U.S. Appl. No. 13/464,663, 9 pages.
Response to Office Action filed Jan. 20, 2015 in U.S. Appl. No. 13/464,696, 15 pages.
Notice of Allowance dated Jan. 20, 2015 in U.S. Appl. No. 13/464,663, 16 pages.
Combined Search and Examination Report, dated Sep. 27, 2012, GB Patent Application No. GB1208056.0.
Combined Search and Examination Report, dated Oct. 9, 2012, GB Patent Application No. GB1208058.6.
Combined Search and Examination Report, dated Oct. 9, 2012, GB Patent Application No. GB1208059.4.
Combined Search and Examination Report, dated Oct. 8, 2012, GB Patent Application No. GB1208060.2.
BC6H Format, 2011 Microsoft, http://msdn.microsoft.com/en-us/library/hh308952(d=printer).aspx.
BC7H Format, 2011 Microsoft, http://msdn.microsoft.com/en-us/library/hh308953(d=printer).aspx.
Block Truncation Coding, Wikipedia, Aug. 2013, http://en.wikipedia.org/wiki/Block_Truncation_Coding.
Fenney, "Texture Compression using Low-Frequency Signal Modulation," Graphics Hardware 2003, Imagination Technologies Ltc., UK, The Eurographics Association 2003.
PVRTC, Wikipedia, Mar. 2012, http://en.wikipedia.org/wiki/PVRTC.
S3 Texture Compression, Wikipedia, Nov. 2013, http://en.wikipedia.org/wiki/S3_Texture_Compression.
Strom, "iPackman: High-Quality, Low-Complexity Texture Compression for Mobile Phones," Lund University, Graphics Hardware 2005, The Eurographics Association.
Notice of Allowance dated Feb. 6, 2015 in U.S. Appl. No. 13/464,696, 22 pages.
Response to Office Action filed Feb. 18, 2015 in U.S. Appl. No. 13/464,686, 17 pages.
Restriction dated Mar. 27, 2015 in U.S. Appl. No. 13/464,676, 6 pages.
Final Office Action dated Apr. 9, 2015 in U.S. Appl. No. 13/464,686, 25 pages.
New U.S. Appl. No. 14/704,962, filed May 5, 2015, 155 pages.
New U.S. Appl. No. 14/691,572, filed Apr. 20, 2015, 114 pages.
Response to Office Action (Restriction Requirement) filed May 22, 2015 in U.S. Appl. No. 13/464,676, 7 pages.
Office Action dated Aug. 20, 2015, in U.S. Appl. No. 13/464,676, filed May 4, 2012.
Amendment dated Oct. 8, 2015, in U.S. Appl. No. 13/464,686, filed May 4, 2012.
Office Action dated Oct. 23, 2015, in U.S. Appl. No. 13/464,686, filed May 4, 2012.
Notice of Allowance dated Aug. 2, 2016, in U.S. Appl. No. 14/704,962, filed May 5, 2015.
Office Action dated Dec. 24, 2015 in U.S. Appl. No. 14/691,572, filed Apr. 20, 2015.
Office Action dated Dec. 20, 2015 in U.S. Appl. No. 14/704,962, filed May 5, 2015.
Response to Office Action dated Jan. 25, 2016 in U.S. Appl. No. 13/464,686, filed May 4, 2012.
Response to Office Action dated Feb. 22, 2016 in U.S. Appl. No. 13/464,676, filed May 4, 2012.
Examination Report dated May 26, 2016, in European Patent Application No. GB1404642.9.
Notice of Allowance dated Aug. 15, 2016, in U.S. Appl. No. 14/691,572, filed Apr. 20, 2015.
Office Action dated May 20, 2016, in U.S. Appl. No. 13/464,676, filed May 4, 2012.
Final Office Action dated Apr. 13, 2016, in U.S. Appl. No. 13/464,686, filed May 4, 2012.
Response to Office Action filed Jun. 17, 2016 in U.S. Appl. No. 14/704,962, filed May 5, 2015.
Response to Office Action filed Jun. 16, 2016 in U.S. Appl. No. 14/691,572, filed Apr. 20, 2015.
Amendment dated Oct. 13, 2016, in U.S. Appl. No. 13/464,686, filed May 4, 2012.
Notice of Allowance dated Oct. 28, 2016, in U.S. Appl. No. 13/464,686, filed May 4, 2012.
Amendment dated Nov. 21, 2016, in U.S. Appl. No. 13/464,676, filed May 4, 2012.
Notice of Allowance dated Dec. 16, 2016, in U.S. Appl. No. 13/464,676, filed May 4, 2012.

* cited by examiner

METHODS OF AND APPARATUS FOR ENCODING AND DECODING DATA

BACKGROUND

The technology described herein relates to a method of and apparatus for encoding and decoding data, and in particular to such a method and apparatus for use to compress and decompress texture data in computer graphics systems.

It is common in computer graphics systems to generate colours for sampling positions in the image to be displayed by applying so-called textures or texture data to the surfaces to be drawn. For example, surface detail on objects may be generated by applying a predefined "texture" to a set of polygons representing the object, to give the rendered image of the object the appearance of the "texture". Such textures are typically applied by storing an array of texture elements or "texels", each representing given texture data (such as colour, luminance, and/or light/shadow, etc. values), and then mapping the texels onto the corresponding elements, such as (and, indeed, typically) a set of sampling positions, for the image to be displayed. The stored arrays of texture elements (data) are typically referred to as "texture maps".

Such arrangements can provide high image quality, but have a number of drawbacks. In particular, the storage of the texture data and accessing it in use can place, e.g., high storage and bandwidth requirements on a graphics processing device (or conversely lead to a loss in performance where such requirements are not met). This is particularly significant for mobile and handheld devices that perform graphics processing, as such devices are inherently limited in their, e.g., storage, bandwidth and power resources and capabilities.

It is known therefore to try to encode such texture data in a "compressed" form so as to try to reduce, e.g., the storage and bandwidth burden that may be imposed on a device.

One known such texture data compression technique determines a set or palette of colours to be used for, e.g., a given texture map, and then stores for each texture element (texel) in the texture map an index into the set or palette of colours, indicating the colour to be used for that texel. This has the advantage that only an index, rather than a full (e.g.) colour value needs to be stored for each texel. This helps to reduce, e.g., the texture data storage requirements, but still has some drawbacks, such as in terms of reduced image quality and the necessary data processing.

Another known texture compression technique is to use so-called block truncation coding (BTC). In this technique the overall texture array (texture map) is subdivided into smaller blocks, e.g. of 4×4 texels, and a number (typically two) of base or primary colour values are determined for each such block, with each texel in the block being set to one of the base colour values. This again saves on the data that has to be stored and accessed, but at a cost of lower image quality.

U.S. Pat. No. 5,047,853 describes an improved block truncation coding technique. In this technique, two base colours are again stored for each texel block, but two additional colours to be used for the block are also derived from those two base colours (e.g. by linearly blending those colours). In this way, four colours are provided as a "palette" for the texel block, but only two colour values need to be stored for the block. Each texel in the block is then encoded using two bits, to indicate which of the four block "colours" should be used for the texel. This system provides improved image quality over basic block truncation coding, but requires more data per block.

The Applicants believe that there remains scope for improved data encoding and compression techniques, particularly for use for texture data for graphics processing.

BRIEF DESCRIPTION OF THE DRAWINGS

A number of embodiments of the technology described herein will now be described by way of example only and with reference to the accompanying drawings, in which.

DETAILED DESCRIPTION

Figure 1:
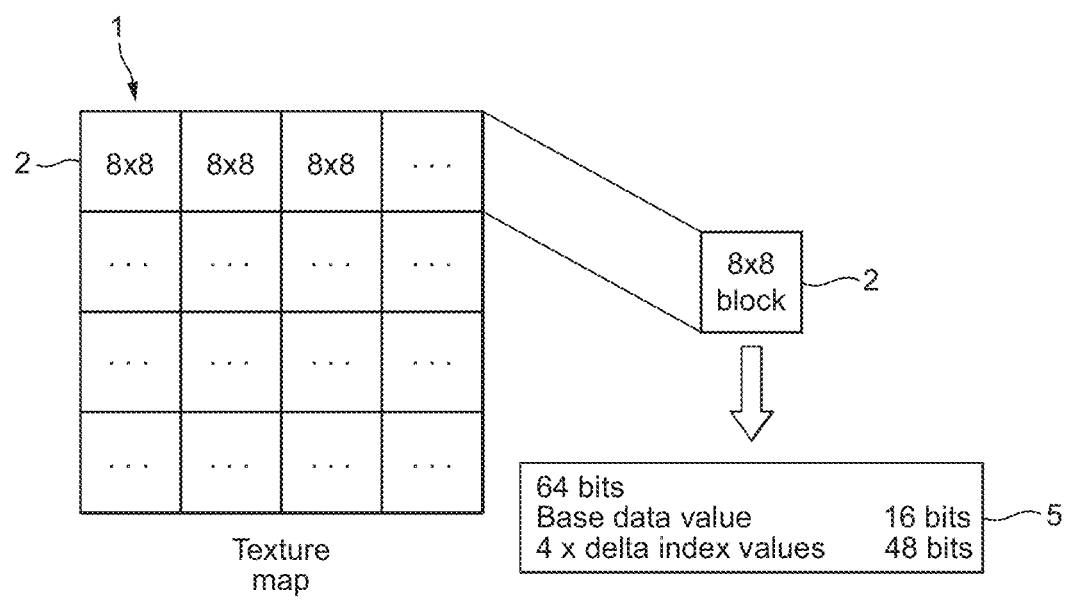
FIG. 1 shows schematically the encoding of an array of image data as a plurality of encoded data blocks in accordance with an embodiment of the technology described herein.

A first embodiment of the technology described herein comprises a method of encoding a set of texture data elements to be used in a graphics processing system, the method comprising:

determining a lower resolution representation of the set of texture data elements;

determining a full resolution set of difference data for representing the difference between an upscaled version of the determined lower resolution representation of the set of texture data elements, and the original set of texture data elements; and encoding the set of texture data elements as one or more blocks of texture data representing the texture data elements, each such block of texture data:

representing a block of texture data elements from the set of texture data elements and including:

data indicating a base data value for the block taken from the determined lower resolution representation of the set of texture data elements; and data indicating the difference data from the determined set of difference data to be used when decoding the block of texture data to generate the data values to be used for the texture data elements that the block of texture data represents.

A second embodiment of the technology described herein comprises an apparatus for encoding a set of texture data elements to be used in a graphics processing system, the apparatus comprising processing circuitry configured to:

determine a lower resolution representation of the set of texture data elements;

determine a full resolution set of difference data for representing the difference between an upscaled version of the determined lower resolution representation of the set of texture data elements, and the original set of texture data elements; and encode the set of texture data elements as one or more blocks of texture data representing the texture data elements, each such block of texture data:
  representing a block of texture data elements from the set of texture data elements and including:
    data indicating a base data value for the block taken from the determined lower resolution representation of the set of texture data elements; and
    data indicating the difference data from the determined set of difference data to be used when decoding the block of texture data to generate the data values to be used for the texture data elements that the block of texture data represents.

A third embodiment of the technology described herein comprises a block of texture data representing a set of texture data elements to be used in a graphics processing system, comprising:
  data indicating a base data value for the block taken from a determined lower resolution representation of the set of texture data elements; and
  data indicating difference data taken from a full resolution set of difference data representing the difference between an upscaled version of the determined lower resolution representation of the set of texture data elements, and the original set of texture data elements, and to be used for the texture data elements that the texture data block represents when decoding the block of texture data to generate the data values to be used for the texture data elements that the block of texture data represents.

In the texture data encoding system of the technology described herein, a set of texture data elements (e.g. representing an image) is encoded as one or more blocks of texture data, with each block of texture data representing a respective block of the texture data elements, like in known, prior art techniques.

However, the technology described herein encodes the texture data by determining (and encoding data representing) a lower resolution representation (version) of the original set of the texture data elements, together with a full resolution set of difference data (i.e. a set of difference data in which there is a separate entry (or entries) for each texture data element (i.e. a set of difference data at the resolution of the original set of texture data elements that is being encoded (at the resolution of the original texture (image))) representing the difference between an upscaled version of the lower resolution representation of the set of texture data elements and the original set of texture data elements. In other words, the present insertion uses the combination of one reduced (lower) resolution data set (the base data values from the lower resolution representation of the set of texture data elements), and one full resolution data set (the set of difference data), to encode a graphics texture.

As will be discussed further below, in encoding scheme of the technology described herein, the lower resolution data set will effectively represent low frequencies in the texture, and the full resolution, difference data set will effectively represent higher frequencies in the texture.

The Applicants have recognised that if one divides a texture into low and high frequency data sets, then the low frequency components can advantageously be compressed using spatial compression, but it would still be desirable to maintain a full resolution representation of the high frequency data. Moreover, as will be discussed further below, the Applicants have further recognised that such a full resolution high frequency data representing data set can still be encoded efficiently, because the short repetition period of the high frequency data in a texture means that that data can be encoded in an efficient manner, even when a full resolution representation of such data is being used. The technology described herein exploits this recognition to provide an improved texture compression scheme.

As will be discussed further below, the Applicants have found that the encoding of the technology described herein can provide relatively high texture data compression rates, whilst still providing acceptable reproduced image quality. For example, it can allow encoding of full RGB textures with acceptable quality for many use cases using only 64 bits per 8×8 texel (texture data element) block (i.e. 1 bpp, 1 bit per pixel (texel) average).

The technology described herein can accordingly reduce significantly the amount of bandwidth, etc., required and consumed when texture mapping in graphics processing systems. This may then allow, e.g., embedded graphics systems to apply textures to visual elements at a high resolution while consuming much less bandwidth than current industry standard texture compression schemes. The technology described herein can also accordingly allow textures to consume less memory, thereby, e.g., allowing them to be uploaded (streamed) to GPU (graphics processing unit) memory quicker (this may be particularly useful for streaming animated (video) textures), and giving games and other graphics applications smaller disk space footprints and shorter loading times.

As will be discussed further below, the encoding format of the technology described herein can also be used to encode single-component textures with very good quality for a 1 bpp format. Correspondingly, two encoded textures of the form of the technology described herein can be used to encode normal data, and RGB+alpha data, in 2 bpp with good quality for the size of the encoded textures.

The Applicants also believe that the lower texture data bit rates provided by the technology described herein may become increasingly advantageous as the screen resolutions of mobile and portable devices increase further in the future.

The technology described herein can be used to encode any suitable form of texture data. As discussed above, such data, in its original, raw or unencoded form, is typically arranged in the form of arrays of texture elements or texels, and thus in an embodiment, the technology described herein is used to encode an array of texture data elements (texels). Such arrays are typically, as is known in the art, 2-dimensional, although it is also possible to use the technology described herein to encode a 3-dimensional array.

The texture to be encoded and the texture data elements can represent any suitable texture data. In one embodiment the texture is a texture that is to be used for graphics processing, e.g., and in an embodiment, when rendering an image and/or frame for display, such as for example an image to be applied to primitives to be rendered, colours (including grayscale), luminances, bump-maps, shadow-maps (light-maps), etc., as is known in the art.

However, the technology described herein can also be used to process and encode (and decode) textures to be used to process, and that represent, other forms of data, e.g. where it is desired to use a graphics texture (and graphics texture processing) to represent and process other forms of data. As is known in the art, textures can be and are used in graphics processing to represent and process many different kinds of data, such as, 3D fog, flow fields, etc. as well as for "traditional" graphics purposes. The technology described herein can equally be applied to, and extends to, these kinds and uses of textures in, and for, graphics processing systems. Thus the texture of the technology described herein may represent other forms of data that are to be processed as a texture in a graphics processing system, if desired.

In an embodiment, the texture data elements each represent a colour value for a texture element, but this is not essential. In an embodiment the texture data elements represent: low dynamic range (LDR) texture data with 1, 2, 3 or 4 components per texel (luminance, luminance-alpha, RGB and RGB-alpha, respectively) or high dynamic range (HDR) texture data with 1, 3 or 4 components per texel.

As will be appreciated by those skilled in the art, the actual data values accorded to the texture elements, both in their original, unencoded raw form, and in their encoded form (or at least when the encoded data has been decoded to reproduce a representation of the original data), will depend on the form of "texture" that the texture elements are intended to define or represent.

Thus, for example, where the texture elements define colours to be used, the texture data elements in their original, unencoded form may each comprise a set of colour values (Red, Green, Blue (RGB), a set of colour and transparency values (Red, Green, Blue, Alpha (RGBa)), or a set of luminance and chrominance values, and the encoded data, when decoded (reproduced), will generate a corresponding set of colour values.

In the case of shadow (light)-maps, for example, the texture data elements, will each comprise or represent a set of data values indicating, e.g., whether the texture element is in light or in shadow, and the amount (and/or colour) of the light or shadow for that texture element. Similarly, for a normal-map (bump-map), the data for each texture element will be a set of values indicating the direction in which light will be reflected at that texture element.

The texture data elements could also, e.g., represent z values (depth values), stencil values, luminance values (luminance textures), luminance-alpha-textures, and/or gloss-maps (i.e. whether a surface is shiny at the texture element position or not), etc.

It would be possible, where appropriate, for each texture data block to only encode data necessary to generate some, but not all, of the data values necessary to reproduce the original data, with the remaining data values being derived (e.g. therefrom) as part of the data reproduction process. Thus, in one embodiment, the encoded texture data encodes data representative of some of the original texture data, with data representative of other parts of the original data being derived from the encoded data during the decoding process.

For example, in the case of normal-maps, it would be possible for the encoded texture data to, e.g., only encode two of the normal direction components (e.g. dx and dy), with the third component (dz) being derived from these two values when the data is decoded (since it is known that the sum of the squares of the components must be 1 (as they define a normal vector of length 1): $1=dx^2+dy^2+dz^2$).

It should be noted here that references herein to "colours" or "luminances", etc., accordingly refer to, as will be appreciated by those skilled in the art, a set of data values that allow the colour or luminance, etc., in question to be reproduced, e.g., on a display. These data values may comprise any suitable set of colour or luminance, etc., data, such as a set of RGB values as discussed above. Equally, references to generating a set of data values for an encoded texture data block, and to data values for individual texture elements, etc., encompass data values that each comprise or include a combination of values, such as a set of colour values (RGB or RGBa), as appropriate.

The set or array of texture data elements that is encoded in accordance with the technology described herein can be any suitable or desired such set. It in an embodiment comprises an entire texture map (e.g. image) to be encoded, but it could comprise only part of a texture map (e.g.), if desired.

Each encoded texture data block that is generated in an embodiment encodes a smaller portion (or block) of the texture map in question, as in traditional block encoding techniques. In such a case, each texture data block will encode and represent a selected sub-set or array of plural texture data elements from the set of original texture data elements. Each texture data block in an embodiment encodes a small rectangular array of texels (which may be square or non-square).

In an embodiment, each texture data block encodes a square array of texels, and in an embodiment an 8×8 block of texels. Other arrangements, e.g. block sizes and/or configurations, would, of course, be possible.

It will be appreciated that in such arrangements, a plurality of such individual texture data blocks will be needed to encode the overall set of original texture data (texture data elements), e.g. make-up the entire texture map. Thus, in an embodiment, the technology described herein includes subdividing the set of texture data elements (e.g. for a texture map) into a plurality of sub-sets of texture data elements, and then encoding each sub-set of texture data elements as a texture data block in the manner of the technology described herein. Thus, the original (initial) set of texture data elements will be encoded as plural blocks of texture data.

In an embodiment the texture being encoded is divided into blocks of equal size (and configuration), i.e. for each sub-set of the texture map for which an encoded block is generated to represent the same number (and, e.g., array) of texture data elements. This can, e.g., simplify the task of finding which block a given texture data element lies in.

Where plural texture data blocks are used to encode a larger texture map (or set or array of texture elements) (or part thereof), the actual subdividing of the array into smaller blocks, and the order of encoding into texture blocks can be selected as desired. In an embodiment the blocks (sub-sets of data) are encoded in raster order, although other arrangements, such as the use of Morton order, would, of course, be possible.

The lower resolution representation of the set of texture data elements to be encoded that is determined should be an appropriate low-frequency representation of the original texture. It is in an embodiment a downscaled (filtered) version of the set of original texture data elements. Thus, the lower resolution representation of the set of texture data elements to be encoded is in an embodiment a lower resolution version of the original texture (image).

The lower resolution representation of the set of texture data elements to be encoded is in an embodiment determined by generating a lower resolution representation of the set of texture data elements to be encoded, but other arrangements, such as calculating an average on a block-by-block basis could be used instead, if desired. The original data is in an embodiment downscaled by a factor of 8 (1:8 in each direction) to determine the lower resolution representation (version) of the set of texture data elements. Thus, in the case of an RGB texture, for example, the lower resolution representation of the texture is in an embodiment a lower resolution (1:8 in each direction) RGB image.

Determining and encoding separately a lower resolution representation (version) of the original set of texture data elements has the effect of encoding low frequency data (e.g. low frequency hue and luminance in the case of colours) in the encoded texture separately from the high frequency data. This then allows the low and high frequency parts of the data to be encoded using different bit rates, which is then used to provide a more efficient compression (encoding) scheme. In particular, as will be discussed further below, a relatively lower bit rate can be used for the high frequency part of the data, as the human eye is less sensitive to noise in the higher frequencies of an image (thereby allowing a less accurate representation of the high frequencies to be used without too much loss of perceived quality).

The data that is included in an encoded texture block for indicating a base data value from the lower resolution representation of the original data for the texture data block can take any desired and suitable form, such as an index into a look-up table of values. However, it in an embodiment comprises an actual base data value to be used for the texture data block. There is in an embodiment one and only one such data value (or index for such a data value) included in each encoded texture data block (i.e. each encoded texture data block will have a single base data value included in it (associated with it)). The base data value (or index for such a value) is in an embodiment a 16-bit value.

The base data value included in an encoded texture data block is in an embodiment a (the) data value taken directly from the lower resolution representation (version) of the original data, and in an embodiment a (the) data value taken directly from the position (data element) in the lower resolution representation (version) of the original data that corresponds to the block of texture data elements in the original data that the encoded texture data block represents. For example, and in an embodiment, where each encoded texture data block represents an 8×8 block of texels, and the original texture is downscaled by a factor of 8 to generate the lower resolution version of the texture, there should be one texture element value in the lower resolution version of the texture for each 8×8 block of texels that the texture map will be divided into for encoding purposes.

Thus, the level of downscaling used to determine the lower resolution version of the original data in an embodiment corresponds to (and equals) the size of the individual blocks of texture data elements that will be encoded as separate encoded texture data blocks. Thus, for example, if each encoded texture data block is to represent A×A texels of the original texture, the lower resolution representation of the original texture is in an embodiment determined by downscaling the original texture by a factor of A (in each direction).

The data value that is included in each encoded texture data block for this purpose may take any suitable form, depending, e.g., upon the nature of the texture data being encoded. As discussed above, it in an embodiment comprises a single texture data value of the form used for the original texture data. Thus, for example, for an RGB565 texture, the base data value that is included in the texture data block for indicating the base data value to be used from the lower resolution image in an embodiment comprises an RGB565 value (and in an embodiment a single RGB565 value). For other forms of texture data, the base data value should have a corresponding form (this will be discussed further below).

The determined full resolution set of difference data for representing the difference between an upscaled version of the lower resolution representation of the texture and the original texture can taken any suitable and desired form. This set of difference data is in the form of a full resolution set of difference data, i.e. having a separate (and respective) difference data value (or values) for each texture data element of the original texture (i.e. is a set of difference data at the resolution of the original texture (image) (and that could accordingly be applied to a representation of the original texture generated by upscaling the lower resolution version of the texture to the resolution of the original texture (to an upscaled version of the lower resolution representation of the texture), to generate (reproduce) an appropriate approximation to the original texture)). This set of difference data will, as discussed above, effectively represent the high frequencies in the original texture.

In an embodiment, the set of difference data is in the form of a full resolution difference (delta) mask, having a separate (and respective) difference data value (or values) for each texture data element of the original texture.

In an embodiment, the set of different data comprises a set of values to be used with corresponding base data values for the texture data elements that the encoded blocks represent so as to be able to generate an appropriate approximation to the original texture data element values for the texture data elements that the encoded blocks represent. The set of difference data accordingly in an embodiment comprises a set of signed integer values that are to be used with base data values for the encoded texture data elements to generate data values for the texture data elements that the encoded blocks represent when decoding the blocks, the set comprising a signed integer value (or values) for each encoded texture data element that the encoded blocks represent.

Thus, the determined set of difference data for representing the difference between an upscaled version of the lower resolution representation of the texture and the original texture for a given encoded texture data block in an embodiment comprises a set of values to be used with corresponding base data values for the texture data elements that the encoded block represents so as to generate an appropriate approximation to the original texture data element values for the texture data elements that the encoded block represents, the set of values comprising a signed integer value (or values) for each texture data element that the encoded block represents. The set of difference data for the encoded block similarly accordingly in an embodiment comprises a (full resolution) set of signed integer values that are to be used with base data values for the encoded texture data elements that the block represents to generate data values for the texture data elements that the encoded block represents when decoding the block.

Where the texture data includes multiple components, such as red, green and blue components, then the set of difference data could include a separate difference value for each different component of the texture data (such that there would, e.g., be "red" difference values, "green" difference values and "blue" differences for an RGB texture). However, in an embodiment the same difference data value is used for each and every component of the texture data (where the texture data includes multiple components). Thus, for example, the same, single difference value for a given texture data element will be used for each of the red, green and blue values for that texture data element in an RGB texture.

Thus, in an embodiment, the determined set of difference data is in the form of a difference (a delta) mask containing a respective single difference data value for each respective texture data element of the original texture, which single difference data value is to be used for all the components of the texture data element (where appropriate).

The determined set of difference data (e.g. delta mask) should be configured to generate the desired texture data element values for the decoding scheme that will be used when decoding the encoded texture, and in particular in accordance with the process that will be used to upscale the lower resolution representation of the texture when decoding the encoded texture to generate an appropriate base data value for each texture data element of the encoded texture (this will be discussed in more detail below).

Thus, for example, where the decoding process simply uses the base data value indicated for an encoded texture data block as the base data value for each of the texture data elements that the block represents, and then adds the difference value for a given texture data element directly to the so-determined base data value for that texture data element, the set of difference data should represent (at least an approximation to) the respective differences between the respective encoded block base data values from the lower resolution representation of the texture and the values of the corresponding (and appropriate) texture data elements in the original texture. In this case, the set of difference data, e.g. delta mask, should, and in an embodiment does, represent, for each respective texture data element of the original texture, the difference between a texel value of (taken from) the lower resolution version of the texture and the value for the texture data element in the original texture (in the texture being encoded).

In an embodiment, the decoding process, as will be discussed further below, generates the upscaled version of the lower resolution representation of the texture by filtering (interpolating) the lower resolution representation of the texture (i.e. the upscaled version of the lower resolution representation of the texture to which the difference data is to be applied is an upscaled, filtered version of the lower resolution representation of the texture). In other words, the base data value for a given texture data element to be decoded (which is then to be combined with a difference value for that texture data element) is not simply taken to be the base data value for the encoded block that represents that texture data element, but is instead a value that is determined by, in effect, sampling or filtering the lower resolution representation of the texture in a more sophisticated manner.

In this case, the difference data should accordingly be configured to provide the appropriate approximations to the original texture data element values when applied to this form of upscaled version of the lower resolution representation of the original texture.

Thus, in an embodiment, the set of difference data, e.g. delta mask, represents, for each respective texture data element of the original texture, the difference between a filtered, and in an embodiment a linearly filtered, sample (texel value) generated from the lower resolution version of the texture for the texture data element and the value for the texture data element in the original texture (in the texture being encoded).

(As will be discussed further below, the Applicants have recognised that using linear filtering to upscale the lower resolution version of the texture when decoding the encoded texture can make the encoding format of the technology described herein particularly good at conserving low frequency gradients (thereby maintaining smooth gradients in the reproduced texture and reducing banding (which can be a problem with other low bit rate texture compression schemes)). Thus, the difference data (delta mask) is in an embodiment configured for use with such a decoding process.)

Thus, in the case of an RGB565 texture, for example, the determined set of difference data in an embodiment comprises a full resolution luminance delta mask, with signed integers, representing the difference in luminosity (average RGB difference) between, in an embodiment linearly filtered, samples from a lower resolution version of the texture and the original texture. The set of difference data is in an embodiment correspondingly configured for other forms of texture data.

The determined set of difference data to be used for encoding the texture could, e.g., comprise the actual (the "true") differences between the upscaled version of the lower resolution representation of the texture and the original texture.

However, in an embodiment, the set of difference data to be used for the block is an approximation to the "true" set of difference values for the texture being encoded. As will be discussed further below, using an approximation for the set of difference values allows the difference data to be indicated and stored in a compressed form in the encoded texture, thereby facilitating a more efficient encoding of the original texture map. Moreover, the Applicants have found that this is possible without too much loss in reproduced image quality.

Such an approximation to the "true" set of difference values for the texture being encoded can be determined as desired. For example, the actual difference values could first be determined (e.g. by comparing the upscaled version of the lower resolution representation of the texture to the original texture), and then an appropriately compressed version of that true set of difference values generated to be the determined set of difference values to be used for and when encoding the texture.

In an embodiment, the approximation to the "true" set of difference values that is used for a texture being encoded comprises difference values taken from a set of predefined reference difference values (and that have been determined to be an appropriate approximation to the "true" set of difference values for the texture).

In this arrangement there will, accordingly, be a set or sets of predefined (predetermined), reference difference values, and the appropriate ones of the predetermined reference difference values will then be used to approximate the "true" set of difference values for a texture to be encoded (and thus as the determined set of difference values to be used for and when encoding the texture).

In an embodiment, a palette of predefined reference difference values that can be used is defined, and then appropriate parts of that palette are selected to form the determined set of difference values to be used for the texture in question.

Using a predetermined reference set (e.g. palette) of difference values helps to facilitate compression of the texture data, since, for example, the reference set of difference values may be (and indeed, in an embodiment is) a reduced set of difference values to be used for representing the difference values for the textures.

In an embodiment a predefined palette of reference difference values configured as a set of plural different difference value blocks (delta blocks), each containing an array of difference values (in an embodiment in the form of signed integer values), that can then be used, e.g., for a corresponding array of encoded texture data elements, is used. In this arrangement, each predefined block (array) of reference difference values in an embodiment represents a part but not all of (i.e. a sub-set of) the array of texture data elements that an encoded texture data block will represent, such as ½ or ¼ of the array of texture data elements that an encoded texture data block will represent.

Thus, for example, where each encoded texture data block will represent an A×A block of texture data elements, the difference (delta) blocks in the predefined palette of difference data values in an embodiment each represent an A/n×A/n array of difference values, where n is an integer greater than one. In one embodiment, for example, where each encoded texture data block will represent an 8×8 block of texture data elements, the difference (delta) blocks in the predefined palette of difference data values in an embodiment each represent a 4×4 array of difference values. In this case, each difference (delta) block in the reference difference data palette will accordingly correspond to one quarter (a 4×4 block) of an 8×8 block of texture data elements that is encoded.

The predefined reference difference value palette, etc., such as the set of difference (delta) blocks making up that palette, can be determined and derived as desired. For example, a plurality of known and typical textures (such as textures representative of typical game content) could be encoded and tested, e.g. in an interative training manner, so as to derive a suitable reference palette of difference values (e.g. of difference value blocks) that will then be suitable for use with plural different textures to be encoded. The so-determined reference difference values palette (e.g. palette of predefined difference value blocks) should then be stored, e.g. as look-up tables, that an encoder (and a decoder) can then use and reference when encoding (and decoding) the texture data blocks.

In these arrangements, for any given texture to be encoded, the actual, "true" set of difference values for the texture is in an embodiment thus compared to the predefined reference set (palette) of difference values, and the appropriate part or parts (e.g. difference value block or blocks) of the reference set of difference values (e.g., and in an embodiment, that most closely match the "true" set of difference values for the texture) then chosen (selected) on the basis of the comparison as the parts of the reference set of difference values to use to form the determined set of difference values to be used for, and when encoding, the texture.

The comparison between the actual difference values for the texture and the reference set of difference values, e.g. and in an embodiment, to determine which parts of the reference set of difference values most closely match the "true" difference values, can be carried out as desired, and using any suitable comparison and similarity assessment technique, such as, for example, using error comparison techniques to determine the predefined reference difference values that best match the determined "true" difference values for the texture. (The actual, "true" difference values for the texture can be determined as desired, e.g. by generating the upscaled version of the lower resolution representation of the texture and then comparing that to the original texture.)

In an embodiment, the predefined reference difference values to use are determined on a block-by-block basis. Thus, each texture data block to be encoded is in an embodiment tested against the predetermined reference difference values (e.g., and in an embodiment, against predetermined reference difference value blocks), to determine (to select) which predetermined reference difference values (e.g. difference value blocks) to use (work best for) the block.

Thus, in an embodiment, the actual set of difference values for the set of texture data elements that a block of encoded texture data is to represent is compared to a predefined palette of blocks of reference difference values, and a block (or blocks) of reference difference values to use for the set of texture data elements that the block of encoded texture data is to represent is then chosen (selected) on the basis of the comparison (and in an embodiment on the basis of which reference block (or blocks) of difference values most closely matches the actual set of difference values for the block of texture data elements in question).

As discussed above, each reference difference value block in an embodiment corresponds (in size) to a sub-set of the array of texture data elements that an encoded block is to represent, and so in an embodiment the comparison for a respective encoded texture data block is done on a "sub-block" basis. Thus, in an embodiment, respective sub-sets of the actual set of difference values for the set of texture data elements that a block of encoded texture data is to represent are each compared to a predefined palette of blocks of reference difference values, and a block of reference difference values to use for each respective sub-set of the set of texture data elements that the block of encoded texture data is to represent is then chosen on the basis of the comparison (and in an embodiment on the basis of which reference block of difference values most closely matches the "true" difference values for the sub-set of difference values for the block of texture data elements in question).

The data that is included in each encoded texture data block to indicate the difference data from the determined set of difference data to be used for the block can indicate the difference data in any desired and suitable manner. It could, for example, comprise the relevant difference values themselves, or an index indicating the value(s) to be used (which would then be taken, e.g., from a look-up table).

Where, as discussed above, a palette of possible sets of difference data values is defined, then the data that is included in the encoded texture data block for indicating the difference data to be used in an embodiment indicates which elements or part or parts of the predefined palette is to be used for the encoded block in question.

Thus, where a predefined palette of reference difference values is used, then the data indicating the difference values to be used for an encoded texture data block that is included in an encoded texture data block is in an embodiment in the form of a data value, such as and in an embodiment, an index value, that indicates which part or parts of the palette of reference difference values is to be used for the encoded texture data block.

Thus, in an embodiment, where the palette of predefined reference difference values is in the form of predefined blocks (arrays) of difference values, the encoded texture data blocks include an index value or values, indicating which predefined block or blocks of difference values is or are to be used for the encoded texture data block. Thus, where each encoded texture data block represents an 8×8 block of texture data elements, and the predefined palette of reference difference values is in the form of predefined 4×4 difference value blocks, each encoded texture data block in an embodiment includes 4 index values, indicating which predefined 4×4 difference value block is to be used for each respective 4×4 block of the 8×8 block of texture data elements.

The, e.g., index values into the predefined palette of reference difference values could simply index into, e.g., a set of reference difference value blocks corresponding to the number of unique index values that is supported. However, in an embodiment, the index value scheme is configured such that a smaller stored predefined set of reference difference value blocks can be used to generate a larger set of predefined reference difference value blocks that can be used. This is in an embodiment done by the indexing scheme encoding and exploiting symmetries, such as rotational symmetry, and other relationships, between the difference value blocks that can be used.

For example, the index values that are used can, and in an embodiment do, indicate a base index into a stored set of predefined reference difference value blocks, and one or more of, and in an embodiment all of: the orientation (rotation) to be used for the indexed stored block; whether the sign of the stored block values is to be negated or not; and whether the stored block values should be multiplied by a scaling factor or not (and in an embodiment the value of the scaling factor, if used).

In an embodiment, a 12-bit index value is used to indicate the reference set of difference values to be used, in an embodiment configured as follows: a 7-bit base index into a stored set of predefined reference difference value blocks; a 2-bit value defining the orientation (rotation) to be used for the indexed stored block; a 1-bit value defining the sign of the stored block values (if set, all block values are to be negated); and a 2-bit value defining the amplitude of the block (all block values are multiplied by one plus this value).

This will then allow a stored set of 128 predefined reference difference value blocks to be used to generate 4096 different reference difference value blocks to be used for the difference values for blocks of texture data elements to be encoded.

Thus, in an embodiment, each encoded texture data block represents an 8×8 block of texture data elements, the predefined reference difference data value blocks comprise 4×4 arrays of difference values, and each encoded texture data block includes 4 index values for indicating the reference difference value blocks to be used for that encoded texture data block, with each index value in an embodiment having 12-bits, and in an embodiment having the format described above.

Similarly, in an embodiment, each encoded texture data block will include (and only include) a base data, e.g. colour, value for the block and four index values indicating reference difference value blocks to be used for the block. In an embodiment, the base data value will be a 16-bit value (e.g. a single RGB565 value) and the difference block index values will be 12-bits each. In this format, a given 8×8 array of texture data elements will be encoded using 64-bits, i.e. using 1 bit per pixel (per texel).

It can be seen from the above that the Applicants have recognised that the set of difference values used in the encoding scheme of the technology described herein can still be encoded in an efficient manner, by exploiting the short repetition periods that there will typically be in the high frequency data that the set of difference values effectively represents. In particular, the Applicants have recognised that blocks of difference values across graphics textures will tend to repeat and be similar enough that they can be encoded (and represented) sufficiently accurately by repeating blocks (sets) of difference values from a more limited, representative, set of difference values (difference value blocks). This then means that it is still possible to encode textures in an efficient manner, whilst still using a full resolution set of difference values to represent the higher frequencies in the textures (and thereby enhancing the accuracy of the encoded textures).

Thus, in an embodiment, the encoding of the set of difference data in the encoded texture data blocks exploits repetition in the set of difference data for the texture (and for the textures) being encoded. In an embodiment, the set of difference data is encoded by re-using (repeating) the same set of difference data for different encoded texture data blocks representing the texture (i.e such that two or more of the encoded texture data blocks for a texture will use the same set of difference data).

Similarly, in an embodiment, a common set of difference data is used to encode plural different textures, by using appropriate parts of the common set of difference data to represent the difference data for each respective texture. Thus, a common, reference set (the same set) of difference data is in an embodiment re-used for plural different textures to be encoded.

Although the technology described herein has been described above primarily with reference to the encoding of a colour, RGB, texture map, the Applicants have recognised that the technology described herein may also be advantageously used to represent single-component (grey scale) textures as well, even when not representing luminosity. This is because the format of the technology described herein can spend very few bits representing colour, such that the reproduced texture quality for single-component textures can also be good.

Thus the technology described herein can be, and is in an embodiment, also used for single-component data such as, and in an embodiment, any type of single-component detail map, such as, and in an embodiment, one or more of, and in an embodiment all of: gloss maps, alpha maps, displacement maps and parallax maps. In this case, the base data value will be an appropriate gloss, or alpha, etc., value and the difference values will essentially then represent (an approximation to) the error between the upscaled reproduced data value for a texture data element, and the "true" value of the data element.

In one embodiment, two sets of encoded texture data blocks of the form of the technology described herein (i.e. two encoded textures of the form of the technology described herein) are used together (in combination) to represent a set of texture data elements (a texture map). For example, in the case of normal maps, two single-component encoded textures of the form of the technology described herein could be used to encode the X and Y components, e.g., and respectively, of the normal map, with the Z component then being reconstructed by the decoder from knowing that (X, Y, Z) is a unit vector. This would then give good normal map encoding at a rate of 2 bpp. Similarly, two separate textures of the form of the technology described herein could be used to give 2 bpp encoding of an RGB+ alpha texture map.

The technology described herein can also be used to encode HDR (High Dynamic Range) textures. For example, for a single component HDR texture, the base colour value for a block could be encoded as an L8E8 (8-bit signed luminance, 8-bit signed exponent) value, rather than an RGB565 value (where 16-bit base data values are used), to give a common base luminance value and exponent for the encoded block.

It would also be possible to use two textures of the form of the technology described herein to encode HDR RGB data+(0 . . . 1) alpha in 2 bpp (and in an embodiment, this is done). In this case the RGB data could be encoded using an RGB565 base colour value for each block, and the alpha data encoded in a separate texture using an A8E8 base value, where A is the base alpha value for the block, but the exponent (E) value for the "alpha" encoded texture is used as the exponent for the RGB values of the corresponding RGB texture block, instead of as an exponent for the alpha values.

Where, as in this case, two textures of the form of the technology described herein are to be used in combination, then each respective pair of the two separate encoded 64-bit (e.g.) blocks of the form of the technology described herein (one for the RGB values and one for the Alpha values, for example), is in an embodiment combined into an (e.g.) 128 bit "megablock" representing the relevant portion of the overall texture (e.g. RGB+Alpha for the corresponding block of 8×8 texels of the original texture).

As will be appreciated from the above, the encoded texture data blocks that are generated using the encoding method of the technology described herein will in an embodiment each include (and in an embodiment only include) a (single) base data value for the block to be used for determining base data values (e.g. colours) for the texture data elements that the block represents, and one or more (and in an embodiment four) index values indicating reference blocks of difference values to be used with the base data values for the texture data elements to determine the values for the texture data elements that the encoded texture data block represents.

This information can be included in the encoded texture data blocks in any desired order and arrangement, but in an embodiment a particular (and in an embodiment common) format and organisation is used for each encoded texture data block.

As will be appreciated from the above, the encoding process of the technology described herein will operate to produce a stream or set of encoded texture data blocks representing, and corresponding to, the original texture map. The encoding process of the technology described herein can be carried out in any suitable manner on or using the original texture data that is to be encoded to do this.

For example, the original texture map to be encoded could be downscaled, and then the set of difference values to use for a given block of texture data elements to be encoded determined as discussed above. This will be repeated for each different block that the original data (e.g. texture map) has been divided into, to produce a stream or set of encoded texture data blocks representing, and corresponding to, the original set of data (e.g. texture map).

The set of encoded texture data blocks can then be stored, e.g. on a portable storage device such as a DVD, for later use, e.g. when it is desired to apply the texture to an image to be rendered. In an embodiment a texture is encoded as a set of mipmaps, with each mipmap in an embodiment being generated in the manner of the technology described herein.

Each block that the original data (e.g. texture map) is divided into is in an embodiment the same size and configuration. The block size that is being used is in an embodiment provided to the decoder. The block size is in an embodiment not included in the encoded texture data blocks themselves, but is in an embodiment provided to the decoder separately. For example, the block size could be implicitly indicated by another parameter that is provided to the decoder, such as the image type, or included in (and indicated in) a (global) data header that is associated with (attached to) the set of encoded texture data blocks.

The above primarily describes the encoding technique of the technology described herein. As will be appreciated by those skilled in the art, the technology described herein also extends to the reverse, decoding, process, i.e. in which an encoded texture data block or blocks is used to produce one or more or an array of texture data elements for use. The decoding process can be carried out in any suitable and desired manner.

The decoding process in an embodiment first comprises determining which encoded texture data block in the set of encoded texture data blocks representing the texture map to be used represents (contains) the texture data element whose value is required (i.e. that is to be decoded). This may be done, e.g., and in an embodiment, based on the position of the texture data element (and, e.g., knowledge of the block size and size of the texture).

The identified encoded texture data block can then be used to determine the value to be used for the texture data element in question. This process will be essentially the reverse of the encoding process, and thus comprise, e.g., determining using a base data value in the encoded texture data block a base data value to be used for a texture data element or elements of the blocks, determining from the encoded texture data block a difference value or values for the block, and using the determined base data value(s) for the texture data element(s) of the block and the determined difference value or values to generate the data value or values (e.g. colours) to be used for an individual texture data element or elements that the block represents.

The so-generated, decoded texel values can then be applied, as is known in the art, to sampling positions and/or fragments that are being rendered to generate rendered data for those sampling positions and/or fragments, which rendered data is then, e.g. written to a frame buffer for a display to display the "textured" sampling positions and/or fragments.

Thus, the technology described herein also extends to a decoder and a decoding apparatus configured to decode a texture that has been encoded in the manner of the technology described herein.

The decoding process can, and indeed in an embodiment does, include one or more or all of the various features of the technology described herein discussed herein, as appropriate.

Thus, a fourth embodiment of the technology described herein comprises a method of decoding a texture data block that encodes a set of texture data elements to be used in a graphics processing system to determine the value of a texture data element that the block represents, comprising:

determining from the encoded texture data block a base data value for the encoded texture data block taken from a lower resolution representation of the set of texture data elements that the block represents, and using the determined base data value for the texture data block to determine a base data value to be used for the texture data element that the block represents whose value is to be determined;

determining from the encoded texture data block a difference data value to be used when decoding the block of texture data to generate the data value to be used for the texture data element that the block represents whose value is to be determined; and using the determined base data value for the texture data element together with the determined difference value for the texture data element to generate a data value to be used for the texture data element.

A fifth embodiment of the technology described herein comprises an apparatus for decoding a texture data block that encodes a set of texture data elements to be used in a graphics processing system to determine the value of a texture data element that the block represents, the apparatus comprising processing circuitry configured to:

determine from an encoded texture data block a base data value for the encoded texture data block taken from a lower resolution representation of the set of texture data elements that the block represents, and use the determined base data value for the texture data block to determine a base data value to be used for a texture data element that the block represents whose value is to be determined;

determine from an encoded texture data block a difference data value to be used when decoding the block of texture data to generate the data value to be used for a texture data element that the block represents whose value is to be determined; and use a determined base data value for a texture data element together with a determined difference value for the texture data element to generate a data value to be used for the texture data element.

As will be appreciated by those skilled in the art, all of these embodiments of the technology described herein can, and in an embodiment do, include any one or more or all of the features of the technology described herein described herein, as appropriate. Thus, for example, the encoded texture data blocks in an embodiment represent 8×8 arrays of texture data elements, and are in an embodiment 64 bits in size.

In the decoding process of the technology described herein, the base data value to be used for a given texture data element can be determined using the base data value for (determined from) (i.e. indicated by) the encoded texture data block in any desired and suitable manner. For example, it could simply be taken to be the base data value for the encoded texture data block itself (i.e. that is determined from the encoded texture data block).

However, in an embodiment, the base data value to be used for a texture data element whose value is to be determined is determined by using the base data value for the encoded texture data block in question (i.e. to which the texture data element belongs), in combination with a base data value or values taken from the lower resolution representation for the texture for one or more other encoded texture data blocks representing the texture (i.e. the base data value to be used for a texture data element whose value is to be determined is in an embodiment determined using base data values taken from a lower resolution representation of the texture for plural encoded texture data blocks).

In an embodiment this is done by combining the base data values for the plural encoded texture data blocks in question to derive a base data value for the texture data element in question, e.g., and in an embodiment, based on the position of the texture data element in question. In an embodiment, and as discussed above, base data values for plural encoded texture data blocks are linearly filtered, based on the position of the texture data element whose value is to be determined, to determine the base data value to be used for the texture data element. As discussed above, the Applicants have found that using such linear filtering can help to conserve low frequency gradients and avoid banding in the decoded texture.

Thus, in an embodiment, the base data value to be used for a texture data element of a given texture data block is determined by linearly filtering base data values from plural encoded texture data blocks.

Where the base data values for plural encoded blocks are used to derive the base data value to be used for a texture data element to be decoded, then in an embodiment the base data value for the block that the texture data element belongs to is used, together with the base data values for the three closest neighbouring blocks to the texture data element in question. This will then facilitate determining the base data value to be used for the texture data element using bilinear filtering, for example. Other arrangements would, of course, be possible.

Where the base data values for plural encoded blocks are to be used in this manner, then the decoding process should, and in an embodiment does, accordingly comprise: identifying the relevant encoded texture data blocks whose base data values are to be used (e.g. and in an embodiment, the block that contains the texture data element to be decoded, and the relevant neighbouring blocks (for example) based on the position of the texture data element to be decoded); determining the base data values for each of the so-identified blocks; and then using those determined base data values to generate the base data value to be used for the texture data element in question (e.g., and in an embodiment, by linearly filtering the base data values for the blocks in accordance with the position of the texture data element in question).

The difference data value to be used for the texture data element whose value is to be determined can similarly be determined from the encoded texture data block in any desired and suitable manner, depending, e.g. upon how the encoded texture data block indicates (represents) the difference values. For example, where the encoded block includes the difference values directly, the relevant difference value in the block could be identified and then used.

In an embodiment, and as discussed above, the difference data value to be used for the texture data element to be decoded is determined by using an index value (or values) included in the block to identify a set of predefined difference data (and in an embodiment a predefined block of difference data), e.g., that is stored in a look-up table, to use for the block.

This process in an embodiment further comprises determining from the index value included in the block whether any operation, such as one or more of, and in an embodiment all of, rotation, negation or scaling (amplification), should be performed on (applied to) the predefined block of difference data to give (generate) the set of difference data to be used for the block. If so, the indicated operation is in an embodiment applied to the identified set of difference data.

Once the predefined set of difference data values to be used for the texture data element in question, has been identified, and, e.g., rotated, scaled, etc., as required, the particular difference value to be used for the texture data element in question is in an embodiment then selected (determined) from the set of difference data values, e.g., and in an embodiment, based on the position of the texture data element in question.

Where, as discussed above, there may be plural difference data index values, e.g., for different quadrants of the block, included in the encoded block, the part of the block (e.g. quadrant) of interest should be identified (e.g. based on the position of the texture data element of interest), and then the index and thus set of difference data for that block part (e.g. quadrant) determined.

Once the difference value and the base data value to be used for the texture data element to be decoded have been determined, they can be used to give the decoded data (e.g. colour) value to be used for the texture data element. In an embodiment the determined difference value and base data value are combined, in an embodiment by adding them together, to do this. Where the texture data includes plural components (e.g. RGB), the difference value is in an embodiment combined with (added to) each component of the base data value appropriately. Where there is a single difference value, that same difference value is in an embodiment added separately to each component of the base data value to give the decoded output (e.g. colour) value.

The data (e.g. colour) value determined using the base data value and the difference value may be subjected to further processing, if desired or required, before being finally output for use.

For example, where required it may, e.g., be clamped to a desired and permitted value range (such as, and in an embodiment (0, 255) in the case of an RGB colour). In one embodiment this is done.

Similarly, in the case of a single component HDR texture, for example, the resulting value from combining the base and difference values is in an embodiment kept as a signed integer value that is then multiplied by 2 to the power of the exponent and then divided by 255.0 f to give the floating point value to be output and used for the texture data element.

The determined, and if desired clamped, etc., data value for the texture data element can then be output as desired, e.g. to a fragment shader of the graphics processor, for use.

The decoding process may be repeated for each texture data element of the block whose value is required (and for texture data elements in other encoded blocks) (for each texture data element of the texture whose value is required).

In an embodiment, the decoder (decoding apparatus) is implemented in the device that is to use the encoded textures, such as a graphics processor. The decoder is in an embodiment implemented as a dedicated hardware element that is configured to carry out the decoding process.

As will be appreciated from the above, in an embodiment, the decoding process of the technology described herein for an individual texture data element of an encoded texture will accordingly comprise: identifying the encoded texture data block that represents the texture data element and three neighbouring encoded texture data blocks from a set of encoded texture data blocks representing the texture based on the position of the texture data element; determining a base data value taken from a lower resolution representation of the texture for each of the identified texture data blocks; linearly filtering the determined base data values for the identified texture data blocks based on the position of the texture data element to generate a base data value for the texture data element; identifying an index value indicating a predetermined set of difference data values in the encoded texture data block that represents the texture data element based on the position of the texture data element; using the index value to fetch a predetermined set of difference data values from memory; determining from the index value whether any operations (such as, and in an embodiment, rotation, negation, or scaling) need to be applied to the predetermined set of difference values and, if so, applying those operations to the predetermined set of difference values; identifying a difference value from the predetermined set of difference values to use for the texture data element based on the position of the texture data element; and adding the identified difference value for the texture data element to the determined base data value for the texture data element to generate a decoded value for the texture data element (and thereafter, e.g., clamping or otherwise processing the decoded value (if required), and outputting it for use, e.g. by a graphics processor).

Thus, a further embodiment of the technology described herein comprises a method of decoding an encoded texture that represents an array of texture data elements to be used in a graphics processing system, the encoded texture being in the form of a set of encoded texture data blocks, each block representing a sub-set of the texture data elements of the texture, and the method comprising determining the value of an individual texture data element that the encoded texture represents, by:

identifying the encoded texture data block that represents the texture data element whose value is to be determined and three neighbouring encoded texture data blocks from the set of encoded texture data blocks representing the texture, based on the position of the texture data element whose value is to be determined;

determining a base data value taken from a lower resolution representation of the texture for each of the identified texture data blocks;

linearly filtering the determined base data values for the identified texture data blocks based on the position of the texture data element to generate a base data value for the texture data element;

identifying an index value indicating a predetermined set of difference data values in the encoded texture data block that represents the texture data element based on the position of the texture data element;

using the index value to fetch a predetermined set of difference data values from memory;

determining a difference value from the predetermined set of difference values to use for the texture data element based on the position of the texture data element; and using the determined difference value for the texture data element and the determined base data value for the texture data element to give a decoded value for the texture data element.

Similarly, a further embodiment of the technology described herein comprises an apparatus for decoding an encoded texture that represents an array of texture data elements to be used in a graphics processing system to determine the value of an individual texture data element that the encoded texture represents, the encoded texture being in the form of a set of encoded texture data blocks, each block representing a sub-set of the texture data elements of the texture, the apparatus comprising processing circuitry configured to:

identify the encoded texture data block that represents a texture data element whose value is to be determined and three neighbouring encoded texture data blocks from the set of encoded texture data blocks representing the texture, based on the position of the texture data element whose value is to be determined;

determine a base data value taken from a lower resolution representation of the texture for each of the identified texture data blocks;

linearly filter the determined base data values for the identified texture data blocks based on the position of the texture data element to generate a base data value for the texture data element;

identify an index value indicating a predetermined set of difference data values in the encoded texture data block that represents a texture data element based on the position of the texture data element;

use the index value to fetch a predetermined set of difference data values from memory;

determine a difference value from a predetermined set of difference values to use for a texture data element based on the position of the texture data element; and use a determined difference value for a texture data element and a determined base data value for the texture data element to give a decoded value for the texture data element.

As will be appreciated by those skilled in the art, all of these embodiments of the technology described herein can, and in an embodiment do, include any one or more or all of the features of the technology described herein described herein, as appropriate.

Thus, for example, the encoded texture data blocks in an embodiment each represent 8×8 arrays of texture data elements, and are in an embodiment 64 bits in size, and the process in an embodiment further comprises determining from the identified index value whether an operation, such as (and in an embodiment) rotation, negation and/or scaling (amplification), needs to be applied to the predetermined set of difference values and, if so, applying that operation to the predetermined set of difference values when determining the difference value to use for the texture data element in question from the predetermined set of difference values. In an embodiment any orientation affecting operation is performed before the block values are retrieved (as that will influence the values that are looked up), and/or any operations that modify the block values themselves are performed after the block values have been retrieved.

Similarly, the process in an embodiment further comprises outputting the decoded value for the texture data element for use, e.g., by a graphics processor, in an embodiment after first subjecting the decoded value to some further processing, such as clamping it to a permitted range of values.

Equally, the process is in an embodiment repeated for each texture data element of the texture whose value is required.

The technology described herein also extends to the combined use of the encoding and decoding processes of the technology described herein, and similarly to an apparatus that can perform both the encoding and decoding processes of the technology described herein.

Although the technology described herein has been described above with particular reference to the encoding and decoding of texture data in a graphics processing system, as will be appreciated by those skilled in the art, it would equally be applicable to the encoding and decoding of data in other forms of data processing system, and in particular to data that is in the form of (or can be expressed in the form of) arrays or blocks of (similar) data elements (e.g. data elements whose values follow a common or similar format and/or that will be or can be used for a similar or the same purpose or that represent similar information). It is in particular applicable to the encoding and decoding of such data where random access to the data is desired.

Such data could comprise, for example, vector-fields used for simulations, data representing flow-directions for fluids or bounce directions for impacts, etc. (which data would, for example, be analogous to the normal-maps (bump-maps) discussed above in relation to graphics data), heat-maps, or sound data, etc.

In such arrangements, the data can be encoded and decoded in an analogous manner to the texture data as described herein.

Thus, another embodiment of the technology described herein comprises a method of encoding a set of data elements to be used in a data processing system, the method comprising:
   determining a lower resolution representation of the set of data elements;
   determining a full resolution set of difference data for representing the difference between an upscaled version of the determined lower resolution representation of the set of data elements, and the original set of data elements; and
   encoding the set of data elements as one or more blocks of data representing the data elements, each such block of data:
      representing a block of data elements from the set of data elements and including:
         data indicating a base data value for the block taken from the determined lower resolution representation of the set of data elements; and
         data indicating the difference data from the determined set of difference data to be used when decoding the block of data to generate the data values to be used for the data elements that the block of data represents.

Another embodiment of the technology described herein comprises an apparatus for encoding a set of data elements to be used in a data processing system, the apparatus comprising processing circuitry configured to:
   determine a lower resolution representation of the set of data elements;
   determine a full resolution set of difference data for representing the difference between an upscaled version of the determined lower resolution representation of the set of data elements, and the original set of data elements; and
   encode the set of data elements as one or more blocks of data representing the data elements, each such block of texture data:
      representing a block of data elements from the set of data elements and including:
         data indicating a base data value for the block taken from the determined lower resolution representation of the set of data elements; and
         data indicating the difference data from the determined set of difference data to be used when decoding the block of data to generate the data values to be used for the data elements that the block of data represents.

Another embodiment of the technology described herein comprises a method of decoding a data block that encodes a set of data elements to be used in a data processing system to determine the value of a data element that the block represents, comprising:
   determining from the encoded data block a base data value for the encoded data block taken from a lower resolution representation of the set of data elements that the block represents, and using the determined base data value for the data block to determine a base data value to be used for the data element that the block represents whose value is to be determined;
   determining from the encoded data block a difference data value to be used when decoding the block of data to generate the data value to be used for the data element that the block represents whose value is to be determined; and
   using the determined base data value for the data element together with the determined difference value for the data element to generate a data value to be used for the data element.

Another embodiment of the technology described herein comprises an apparatus for decoding a data block that encodes a set of data elements to be used in a data processing system to determine the value of a data element that the block represents, the apparatus comprising processing circuitry configured to:
   determine from an encoded data block a base data value for the encoded data block taken from a lower resolution representation of the set of data elements that the block represents, and use the determined base data value for the data block to determine a base data value to be used for a data element that the block represents whose value is to be determined;

determine from an encoded data block a difference data value to be used when decoding the block of data to generate the data value to be used for a data element that the block represents whose value is to be determined; and use a determined base data value for a data element together with a determined difference value for the data element to generate a data value to be used for the data element.

As will be appreciated by those skilled in the art, all of these embodiments of the technology described herein can, and in an embodiment do, include any one or more or all of the features of the technology described herein described herein, as appropriate. Thus, for example, the encoded data blocks in an embodiment represent 8×8 arrays of data elements, and are in an embodiment 64 bits in size.

The methods and apparatus of the technology described herein can be implemented in any appropriate manner, e.g. in hardware or software, and in (and be included in) any appropriate device or component. In an embodiment they are implemented in a graphics processor, and thus the technology described herein also extends to a graphics processor configured to use the methods of the technology described herein, or that includes the apparatus of the technology described herein. In an embodiment, the methods and apparatus of the technology described herein are implemented in hardware, in an embodiment on a single semi-conductor platform.

The technology described herein can be implemented in any suitable system, such as a suitably configured microprocessor based system. In an embodiment, the technology described herein is implemented in computer and/or microprocessor based system.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner. The various functional elements, etc., may be separate to each other or may share circuitry (e.g. be performed by the same processor), as desired.

It should also be noted here that, as will be appreciated by those skilled in the art, the various functions, etc., of the technology described herein may be duplicated and/or carried out in parallel on a given processor.

The technology described herein is applicable to any suitable form or configuration of graphics processor and renderer, such as tile-based graphics processors, immediate mode renderers, processors having a "pipelined" rendering arrangement, etc.

As will be appreciated from the above, the technology described herein is particularly, although not exclusively, applicable to graphics processors and processing devices, and accordingly extends to a graphics processor and a graphics processing platform including the apparatus of, or operated in accordance with the method of, any one or more of the embodiments of the technology described herein described herein. Subject to any hardware necessary to carry out the specific functions discussed above, such a graphics processor can otherwise include any one or more or all of the usual functional units, etc., that graphics processors include.

In some embodiments the data processing system, graphics processing system, data processors, graphics processors, processing circuitry, apparatus, etc., may be in communication with memory and/or one or more memory devices that store the data described herein, such as the texture data (the original texture and/or the encoded texture), the downscaled version of a texture, the reference set of difference data (difference data blocks), the values of the texture data elements, the encoded texture data blocks, etc., and/or that store software for performing the processes described herein. The data processing system, graphics processing system, data processors, graphics processors, processing circuitry, apparatus, etc., may also be in communication with a display for displaying images based on the generated texture data.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

An embodiment of the technology described herein will now be described with reference to the encoding of texture data (of a texture map) for use in graphics processing. However, as discussed above, and as will be appreciated by those skilled in the art, the technology described herein is applicable to data encoding and decoding in general, and so therefore should not be considered to be limited to the present example of texture data encoding.

FIG. 1 illustrates the basic encoding process of this embodiment. As shown in FIG. 1, an original image or array 1 of texture data elements (texels) (a texture "map") is subdivided into a plurality of 8×8 texture element blocks 2. (Other block sizes can be used, if desired.)

In the present embodiment, as shown in FIG. 1, the original image (texture map) 1 is divided into blocks of equal size. This simplifies the task of finding which block a given texture data element lies in, and gives a constant data rate. (The block size used is passed to the decoder separately, rather than including the block size in the encoded texture data blocks themselves. It may, e.g. be stored as part of the description of the texture as a whole or indicated implicitly by another parameter associated with the texture, such as the image type. In an embodiment, the block size is indicated (explicitly) in a data header that is associated with the set of encoded texture data blocks for the texture in question.)

In this embodiment, each texture element (texel) in the original texture map data array (image) represents the colour to be used at the position of the respective texture element, and accordingly has allocated to it a data value comprising a set of colour values (e.g. red, green, blue (RGB) values). In other words, in this embodiment, the data values that are encoded and generated, etc., each correspond to and represent a colour (a set of colour values). For convenience, the following description will therefore refer primarily to "colours" but it should be understood that such references indicate a data value comprising a set of colour values that represent the colour in question.

In the present embodiment, rather than storing the array of colour data in its full, original form, each 8×8 texture element block 2 is encoded as a texture data block 5 that has a reduced size as compared to the texture data in its original, unencoded form. This, in effect, compresses the original texture data, thereby making its storage and processing easier and more efficient. In the present embodiment, each encoded texture data block 5 uses 64 bits. As each encoded texture data block 5 uses 64 bits to encode an 8×8 array of texels, the encoding is carried out at a 1 bpp (1 bit per pixel average) rate. (Other arrangements would be possible.)

Each encoded, reduced size, texture data block 5 contains, as will be discussed further below, appropriate data to allow data corresponding to or representing the original, unencoded, data of the 8×8 texture element block in question to be reproduced.

In the present embodiment, each texture map is encoded as a texture data file comprising a sequence of individual texture data blocks encoding the array of texture data elements that make up the texture map.

The individual 8×8 texel blocks making up the texture map 1 are encoded in the present embodiment in raster order. Other arrangements, such as the use of Morton order, would, of course, be possible.

The number of texture data blocks in the encoded texture file will depend on the size of the texture map (texture data array) that is being encoded, and, e.g., whether the data is being stored in mip-map form. If mip-maps are used, then if the first level of texture map resolution is encoded using "n" texture data blocks, there will be "n/4" texture data blocks for the mip-map level below, "n/16" blocks for the next mip-map, "n/64" for the next, "n/256" for the next again, and so on (but no less than one block for each level) until the mip-map level with size 1×1 is reached.

(In the present embodiment, the encoded texture data can be and in an embodiment is stored in the form of MIPmaps (i.e. where multiple versions of the original texture data array, each having different levels of detail (resolution), are stored for use). The MIPmaps are in an embodiment stored one after each other in memory, with each MIPmap level being, as is known in the art, a downscaled (by a factor of 2) representation (image) of the original array (image). The MIPmaps are stored in order of descending resolution, i.e. n=n, . . . , 16×16, 8×8, 4×4, 2=2, 1=1. The smaller MIPmaps (<8×8) are each stored individually in a separate encoded data block.)

The format for encoding a block of texture data elements (texels) that is used in the present embodiment will now be described with reference to FIGS. 2, 3 and 4. In this embodiment, it is assumed that the original texture to be encoded is an RGB565 image.

The basic process that is used when encoding a texture in the present embodiment is to divide the texture to be encoded into two separate logical parts: a lower resolution representation (version) of the texture, and a full resolution difference (delta) mask representing the difference between an upscaled version of the lower resolution representation of the texture and the original texture.

The lower resolution version of the original texture effectively encodes the low frequency hue and luminance data in the original texture, whereas the difference (delta) mask represents the high frequency data in the texture. By encoding the original texture in this way, the encoded texture format can use fewer bits to encode the high frequency data without too much loss of perceived quality (as the human eye is more sensitive to noise in the lower frequencies).

Each encoded texture data block 5 that is used to represent the original texture 1 then includes appropriate data from the lower resolution version of the texture, together with data indicating the difference mask values to be used for the block in question.

In the present embodiment, because the texture 1 to be encoded is an RGB image, the lower resolution representation of the texture is a lower resolution (1:8 in each direction) RGB565 image derived from the original texture, and the difference (delta) mask represents the difference in luminosity (the average RGB difference) between an upscaled version of that lower resolution image and the original texture.

Figure 2:
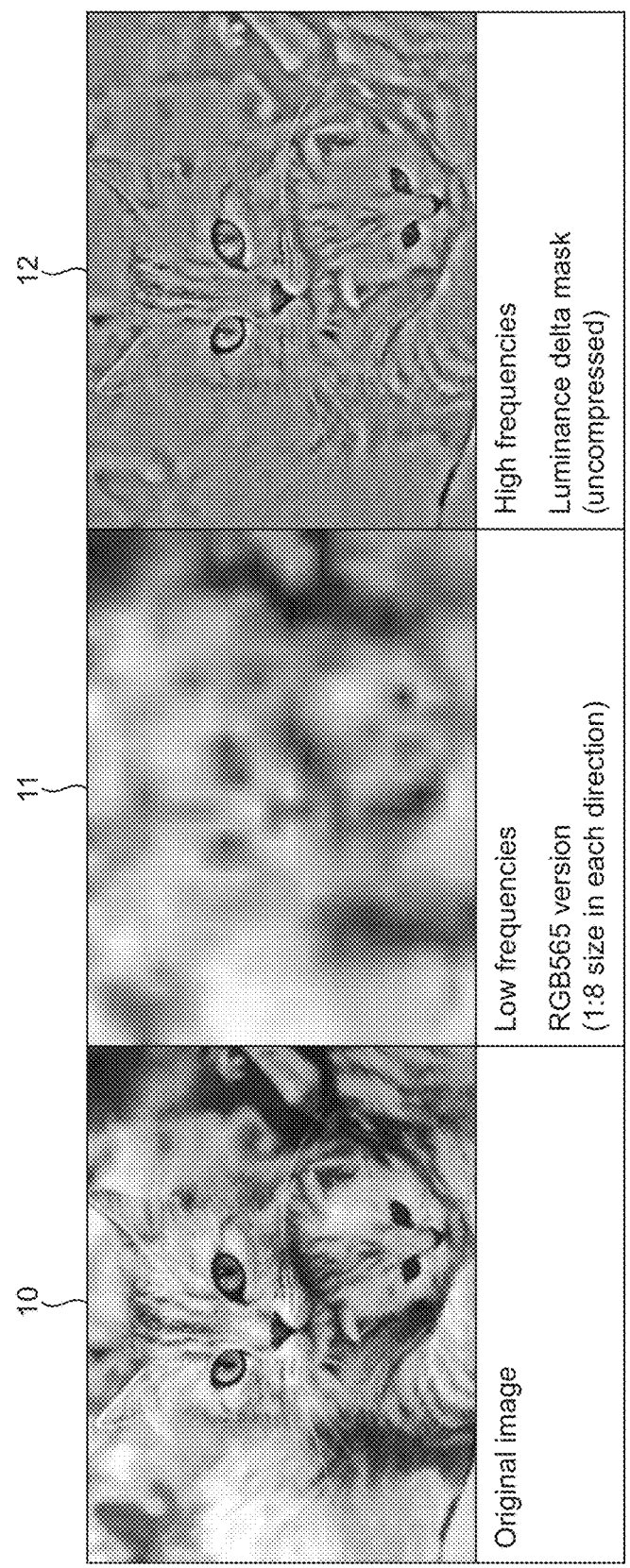
FIG. 2 illustrates the encoding process used in an embodiment of the technology described herein.

FIG. 2 illustrates this and shows an original texture (image) 10 to be encoded, a corresponding lower resolution RGB565 version 11 of the texture, and a full resolution luminance delta mask 12.

Figure 3:
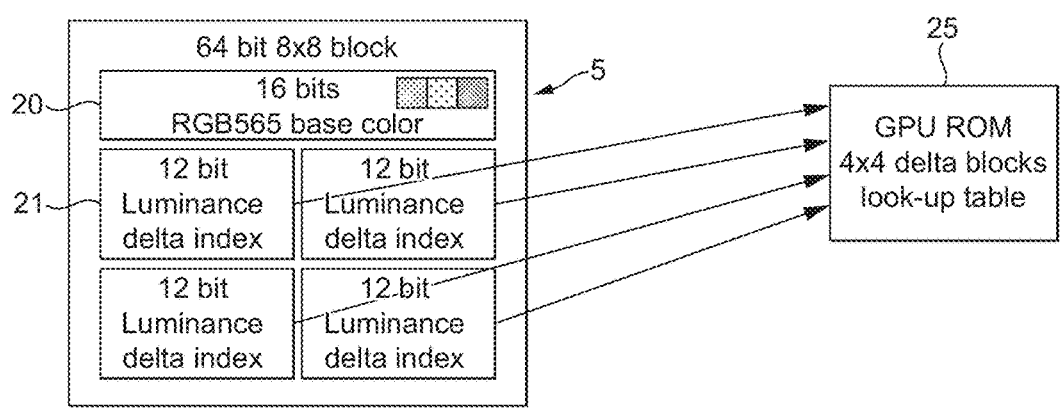
FIG. 3 shows the encoded block layout of the described embodiment of the technology described herein.

FIG. 3 then shows the layout of each 64 bit encoded texture data block that is generated for representing a respective 8×8 block of texels (texture data elements) of the original texture 10.

As shown in FIG. 3, each encoded texture data block 5 that is generated for each respective 8×8 blocks of texels in the texture 10 firstly includes a 16 bit RGB565 base colour value 20, which is taken from the position in the lower resolution representation 11 of the original texture 10 that corresponds to the position of the 8×8 block of texels that the encoded texture data block 5 in question is to represent.

Each encoded texture block 5 also includes four 12-bit luminance delta indices 21, which indicates the luminance delta mask, high frequency, data to be used for the encoded texture block in question. Each such 12-bit delta index 21 indicates a predefined 4×4 block of signed 8-bit integer difference data values to be used for a respective 4×4 texel sub-block of the 8×8 block of texels that the respective encoded texture data block 5 represents.

The predefined 4×4 blocks of difference data values used for this purpose are taken from a predefined palette of 4×4 blocks of difference values that have been determined in advance, for example by encoding plural typical, e.g., game content, textures using differing sets of 4×4 blocks of difference values to thereby determine (e.g. using an appropriate machine learning algorithm) a suitable palette of predefined 4×4 blocks of difference values that can be used to encode and best represent typical textures to be used. Some or all of the so-derived palette of predefined difference value blocks is stored, e.g. as a look-up table 25, for use (both at the encoding side, and by a decoder).

In the present embodiment, various symmetries between the different predefined difference value blocks included in the palette of such blocks that is used are used to allow a smaller number of stored blocks to be used to generate a larger palette of predefined difference values blocks that can be used for encoding (and decoding) textures.

In particular, in the present embodiment, the first 7 bits of each 12 bit index value 21 are used to identify (used as an index to) a 4×4 block of difference values from a look-up table 25 of 128 predefined 4×4 blocks of 8-bit signed integer difference values, the next 2 bits in the 12-bit index 21 are used to define the orientation (rotation) of the block to be used (i.e. whether and how the block from the look-up table should be rotated to give the block of difference values that is actually to be used), the next bit in the 12-bit index 21 defines the sign of the block values to be used (if this bit is set, all the looked-up block values should be negated), and the final 2 bits in the 12-bit index define the scaling to be applied to the looked-up block values (i.e. the amplitude of the block) (all the block values are multiplied by one plus this value).

This then allows 128 stored predefined blocks to be used to generate a palette of 4096 predefined 4×4 difference value blocks for use when encoding and decoding textures.

Figure 4:
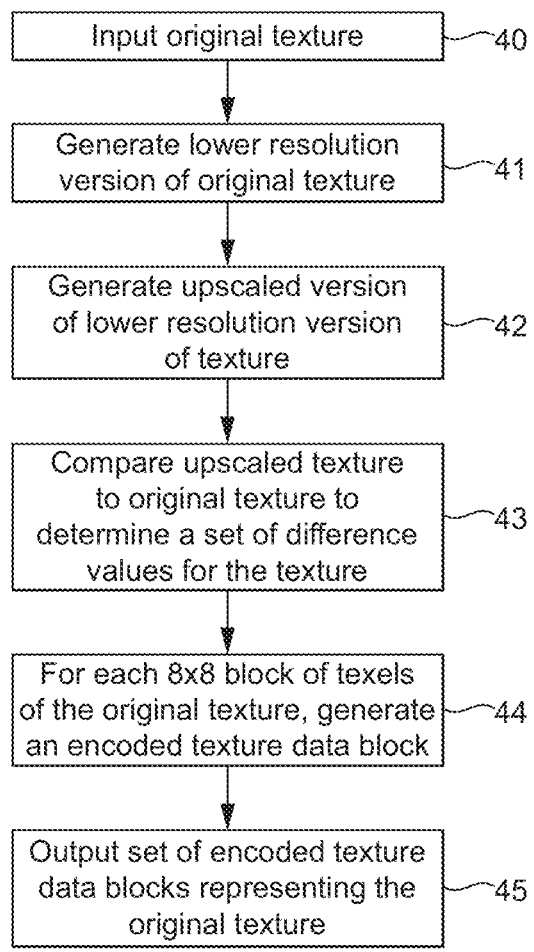
FIG. 4 is a flow chart showing schematically the encoding process of an embodiment of the technology described herein.

FIG. 4 shows schematically the encoding process of the present embodiment. This process may be carried out in any suitable encoder, such as a hardware encoder, or a suitably programmed general-purpose processor, such as a PC that, e.g., has access to the original texture data in memory.

First, the initial texture 10 is input to the encoder (step 40) and then is downscaled to generate a corresponding lower resolution representation 11 of the original texture 10 (step 41).

Then an upscaled, full resolution version (i.e. having the same resolution as the original texture) of the generated lower resolution representation 11 of the texture is generated using linear filtering (step 42). This upscaled version of the lower resolution version 11 of the original texture is then compared to the original texture 10 to determine a set of difference values indicating for each texel the difference (i.e. the error) between the value of the texel in the upscaled version of the lower resolution representation 11 of the texture, and the value of the texel in the original texture 10 (step 43). In the present embodiment, the difference value for a texel is derived as an 8-bit signed integer value representing the average RGB difference between the two texel values. Other arrangements would, of course, be possible.

Once this has been done, an encoded texture data block 5 can then be generated for each 8×8 block of texels in the original texture 10 (step 44).

To do this, a base colour value 20 to be included in the encoded texture data block 5 is first determined. This is done by determining a base colour value 20 from the lower resolution representation 11 of the texture 10 to include in the encoded texture data block 5 by sampling the lower resolution representation of texture 11 at the position that corresponds to the 8×8 texel block that the encoded texture data block 5 is to represent.

Next, the luminance delta index values 21 to be included in the encoded texture data block 5 are determined.

This is done by identifying the determined set of difference values between the upscaled texture lower resolution representation 11 of the texture and the original texture 10 for the 8×8 block of texels that the encoded texture data block 5 is to represent, and then comparing those determined difference values to a predefined set of difference value blocks.

In the present embodiment, each respective 4×4 block of determined difference values for each respective 4×4 texel quadrant of the 8×8 block of texels that is being encoded is compared to a set of 4×4 blocks of predefined difference values in a predetermined palette of predefined 4×4 blocks of difference values to identify the predefined 4×4 block of difference values from the predefined palette of blocks of difference values that most closely matches the "true" determined difference values for the respective 4×4 block of texels of the 8×8 block of texels being considered. (The matching process can use any desired testing scheme such as, for example, measuring the peak signal-to-noise ratio between the determined "true" set of difference values for the block and the possible sets of predefined difference values.) A corresponding luminance delta index 21 for that most closely matching predetermined 4×4 block of difference values is then assigned to and included in the encoded texture data block 5. This is done for each 4×4 quadrant of the 8×8 texel block being encoded, to provide 4 luminance delta index values 21 to be included in the encoded texture data block 5.

This process is repeated for each 8×8 block of texels of the original texture 10, to generate a set of encoded texture data blocks 5 that represent the original texture 10. This set of encoded texture data blocks can then be output and stored (step 45) for future use as a texture, e.g., by a graphics processor. The set of encoded texture data blocks can be stored, e.g. on a portable storage device such as a DVD, for later use, e.g. when it is desired to apply the texture to an image to be rendered. In an embodiment a set of mipmaps is generated to represent the texture, with each mipmap in an embodiment being generated in the above manner.

Figure 5:
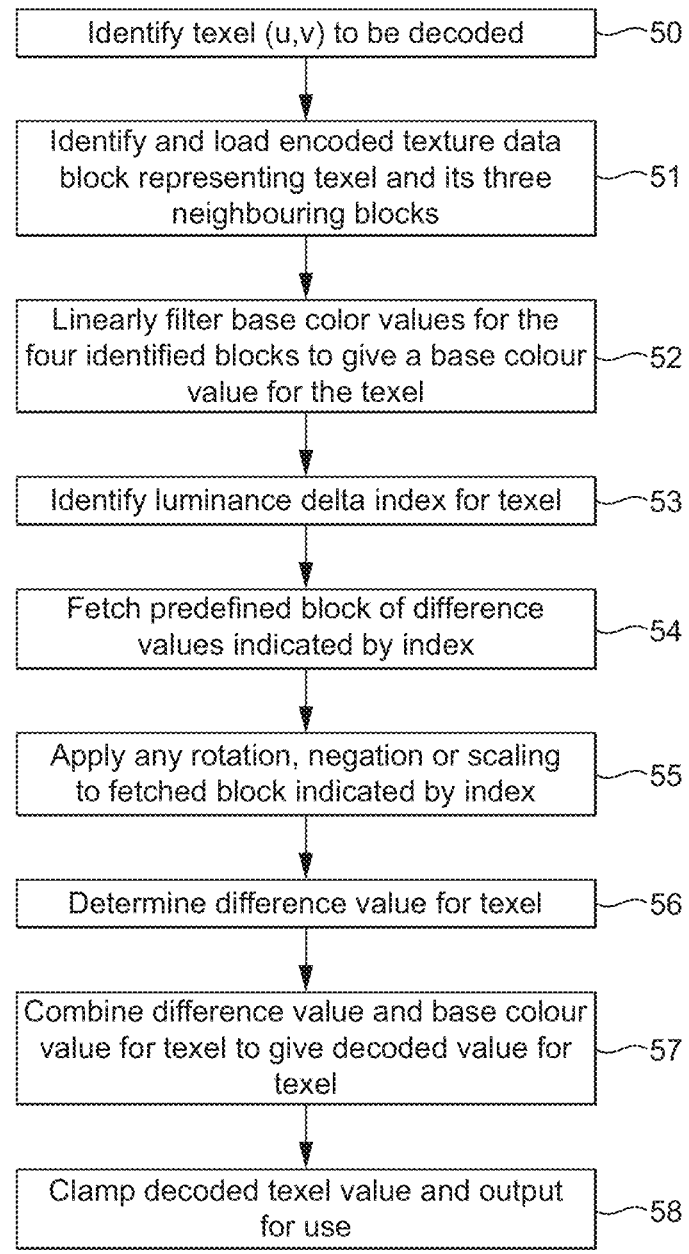
FIG. 5 is a flow chart showing schematically the decoding process of an embodiment of the technology described herein.

The decoding process for using an encoded texture of the form of the present embodiment when processing graphics for display will now be described with reference to FIG. 5. (The decoder may, e.g., be a graphics processor that is to use the texture. In an embodiment a hardware decoder is used.)

The first step in the process is to identify the position (u, v) of the texel whose value is required (is to be determined) (step 50). Using this, the encoded texture data block 5 containing that texel, and its three closest neighbour blocks in the vicinity of that texel, are then identified, and loaded for processing (step 51). Then, the base colour values 20 for each of those four encoded texture data blocks 5 are determined and linearly filtered (i.e. bilinearly filtered) based on the position of the texel of interest to derive a base colour value for the texel whose value is to be determined (step 52).

(The effect of linearly filtering four base colour values to derive a base colour value for the texel of interest is to upscale the lower resolution representation 11 of the texture 10 when decoding the encoded texture by linearly filtering sampled values from the lower resolution version 11 of the texture. This use of linear filtering when decoding to upscale the lower resolution representation of the texture facilitates the conservation of low frequency gradients from the original texture, and avoids, for example, banding in the decoded texture.)

Next, the luminance delta index 21 included in the encoded texture data block 5 that represents the texel whose value is to be determined is identified based on the position (i.e. the quadrant) of the texel of interest in the 8×8 block of texels that the encoded texture data block 5 represents (step 53). Then, the relevant predefined 4×4 block of difference values indicated by the first 7 bits of the 12-bit index 21 is identified and fetched from a look-up table 25 of predefined 4×4 blocks of difference values (step 54). (This look-up table is suitably stored by, or so as to be accessible to, the decoder (e.g. graphics processor) in use). Any required rotation, negation and scaling (amplification) as indicated by the luminance delta index value 21 is then applied to that 4×4 block of difference values (step 55). Following this, the difference value to use for the texel in question is identified from the 4×4 block of difference values based on the position of the texel (step 56).

The so-identified signed integer difference (delta) value is then added (separately) to each of the red, green and blue components of the base colour value 20 determined for the texel to give a decoded RGB value for the texel (step 57).

In the present embodiment, as the texture that has been encoded is an RGB565 texture, the decoded texel red, green, blue values are then clamped to the range (0, 255). The resulting colour value (R/255.0 f, G/255.0 f, B/255.0 f, 1.0 f) is then output for use, such as returned to the fragment shader that requires the texel (step 58).

This process is then repeated for each texel whose value is required.

Figure 6:
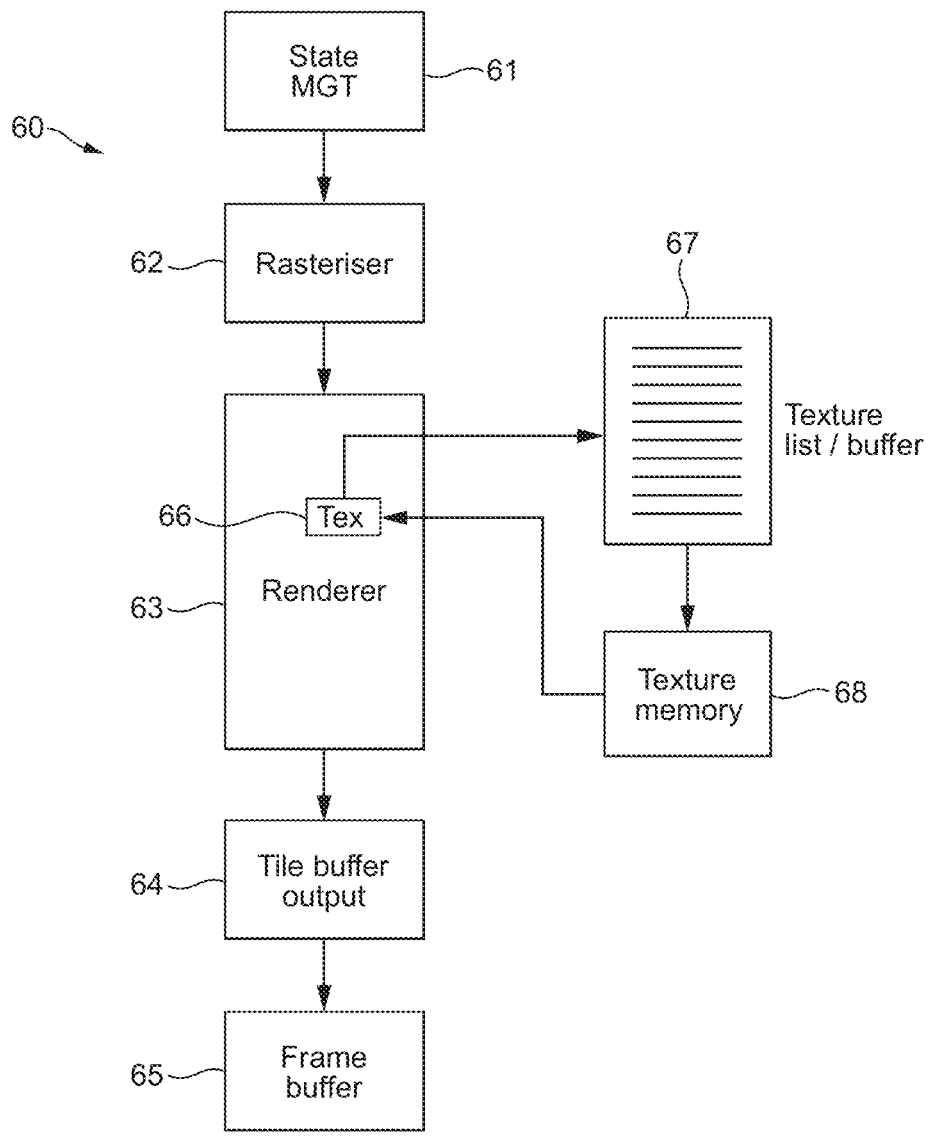
FIG. 6 shows schematically a graphics processing system that can use texture data that has been encoded in the manner of the technology described herein.

FIG. 6 shows schematically an arrangement of a graphics processing system 60 that can use textures that have been encoded in accordance with the present embodiment. In this embodiment, the graphics processing system 60 is a tile-based rendering system. However, other arrangements are, of course, possible.

As shown in FIG. 6, the graphics processing system 60 includes a state management system 61, a rasterising stage 62, and a rendering stage 63 in the form of a rendering pipeline. It will be appreciated that each of the stages, elements, and units, etc., of the graphics processor 60 as shown in FIG. 6 may be implemented as desired and will accordingly comprise, e.g., appropriate circuitry, and/or processing logic, etc., for performing the necessary operation and functions.

The state management system 61 stores and controls state data and the state of the graphics processing units to control the graphics processing operation, as is known in the art.

The rasteriser 62 takes as its input primitives to be displayed, and rasterises those primitives to sampling positions and generates fragments to be rendered, as is known in the art.

The rendering pipeline 63 takes fragments from the rasteriser 62 and renders those fragments for display. As is known in the art, the rendering pipeline 63 will include a number of different processing units, such as fragment shaders, blenders, texture mappers, etc.

The output from the rendering pipeline 63 (the rendered fragments) is output to tile buffers 64 (since the present embodiment is a tile-based system). The tile buffers' outputs are then finally output to a frame buffer 65 for display.

FIG. 6 also shows schematically particular features of the graphics processing system 60 that are provided in order for it to use textures encoded in the manner of the present embodiment.

In particular, as shown in FIG. 6, the rendering pipeline 63 includes a texture mapping stage 66 configured to be able to access a texture list buffer 67 to determine a texture needed for texturing a fragment that it receives for rendering.

The texture list buffer 67 will indicate the texture that is required, and then, as is known in the art, the texture mapper 66 will fetch the relevant texture data from a memory 68 and used the fetched texture data to process the fragment in question.

The textures stored in the texture memory 68 are stored using the encoding format of the present embodiment. Thus, when the texture mapper 66 needs a given texel or texels for applying to a fragment being rendered, it will determine the texture map and encoded blocks within that map that it needs for the texel in question (e.g. based on the position of the texel, and knowledge of the block size and size of the texture, as is known in the art), retrieve those blocks from the memory 68 and then determine the texel's value (e.g. colours) from the encoded blocks in the manner described above.

The texture mapper 66 includes a suitable decoder (decoding circuitry) to do this. This decoder may, e.g., be in the form of a dedicated hardware element that is configured to decode textures encoded in the form of the present embodiment, or it may, e.g., comprise programmable processing circuitry that has been programmed appropriately to be able to decode textures encoded in the form of the present embodiment. In an embodiment a dedicated hardware decoder is used.

This is repeated for each texel value that is required, and the so-generated, decoded texel values are then applied to sampling positions (fragments) that are being rendered to generate rendered data for those sampling positions (fragments), which rendered data is then, e.g., written to the frame buffer for a display to display the "textured" sampling positions and/or fragments.

Although the above embodiment has been described with reference to texture data in the form of RGB colours, as discussed above, and as will be appreciated by those skilled in the art, the technology described herein is also applicable to other forms of texture data, such as luminance-maps or bump-maps, etc., and to other, non-texture data. In such arrangements the data can be encoded or decoded in an analogous manner, but each data value will, e.g., represent a luminance value or normal vector, etc., rather than a colour.

Indeed, the technology described herein may be advantageously used to represent single-component (grey scale) textures, for example. This is because the format of the technology described herein can spend very few bits representing colour, such that the reproduced texture quality for single-component textures can also be good.

Thus in an embodiment, the encoding and decoding process is used for single-component data such as, and in an embodiment, any type of single-component detail map, such as, and in an embodiment, one or more of, and in an embodiment all of: gloss maps, alpha maps, displacement maps and parallax maps. In this case, the base data value 20 included in each encoded texture data block 5 will be an appropriate gloss, or alpha, etc., value and the difference values will essentially then represent (an approximation to) the error between the upscaled reproduced data value for a texture data element, and the "true" value of the data element.

In another embodiment, two sets of encoded texture data blocks of the form of the above embodiment (i.e. two encoded textures of the form of the above embodiment) are used together (in combination) to represent a set of texture data elements (a texture map). For example, in the case of normal maps, two single-component encoded textures of the form of the present embodiment could be used to encode the X and Y components, e.g., and respectively, of the normal map, with the Z component then being reconstructed by the decoder from knowing that (X, Y, Z) is a unit vector. This can then give good normal map encoding at a rate of 2 bpp. Similarly, two separate textures of the form of the present embodiment can be used to give 2 bpp encoding of an RGB+alpha texture map.

The present embodiment can also be used to encode HDR (High Dynamic Range) textures. For example, for a single component HDR texture, the base colour value 20 for a block 5 could be encoded as an L8E8 (8-bit signed luminance, 8-bit signed exponent) value, rather than an RGB565 value (where 16-bit base data values are used), to give a common base luminance value and exponent for the block 5. In this case, the resulting value from combining the base and difference values when decoding the texture is in an embodiment kept as a signed integer value that is then multiplied by 2 to the power of the exponent and then divided by 255.0 f to give the floating point value to be output and used as the value for the decoded texel.

It would also be possible to use two textures of the form of the present embodiment to encode HDR RGB data+(0 . . . 1) alpha in 2 bpp. In this case the RGB data is encoded using an RGB565 base colour value for each block, and the alpha data is encoded in a separate texture using an A8E8 base value, where A is the base alpha value for the block, but the exponent (E) value for the "alpha" encoded texture is used as the exponent for the RGB values of the corresponding RGB texture block, instead of as an exponent for the alpha values.

Where, as in this case, two textures of the form of the present embodiment are to be used in combination, then each respective pair of the two separate encoded 64-bit blocks of the form of the present embodiment (one for the RGB values and one for the Alpha values, for example), is in an embodiment combined into an (e.g.) 128 bit "megablock" representing the relevant portion of the overall texture (e.g. RGB+Alpha for the corresponding block of 8×8 texels of the original texture).

It can be seen from the above that the technology described herein, in its embodiments at least, provides a block-based texture encoding scheme that can allow storage of full RGB textures (and other textures) with acceptable quality for many use cases using only 64 bits per 8×8 texel block (1 bit per texel average).

This can then allow graphics applications to consume less bandwidth when texture mapping primitives in real-time, and his can accordingly facilitate allowing embedded graphics systems to apply textures to visual elements in very high resolution while consuming much less bandwidth than current industry standard texture compression schemes. The lower data rates facilitated by the technology described herein also make textures consume less memory and allows them to be uploaded (streamed) to graphics processor memory quicker. (Thus the technology described herein, in its embodiments at least, may be particularly useful for streaming animated (video) textures). The technology described herein, in its embodiments at least, can accordingly also give games and other graphics applications a smaller disk space footprint and shorter loading times. The format of the technology described herein can also be used to encode single component textures with very good quality for a 1 bit per texel format, and two textures in the form of the technology described herein can be used to encode, for example, normal data or RGB+alpha data in 2 bits per texel with good quality for the size.

The technology described herein accordingly may have particular application in the mobile gaming market, since it provides a high compression rate and therefore is suitable for devices with limited memory resources and memory bandwidth. The high compression rate also facilitates, for example, downloading of games or other applications, since it can alleviate network bandwidth and end user cost issues which increase or are related to the download time.

This is all achieved, in the embodiments of the technology described herein at least, by separating a texture to be encoded into two logical parts, namely a lower resolution representation of the texture, together with a full resolution difference mask representing the difference between an upscaled version of the lower resolution representation of the texture and the original texture, and then encoding in each encoded texture data block an appropriate base data value from the lower resolution representation of the texture, together with data indicating a set of difference mask values to be used for the encoded texture data block.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:
1. A method of encoding a set of texture data elements used in a graphics processing system, the method comprising:
   determining by processing circuitry a lower resolution version of the set of texture data elements;

determining by processing circuitry one or more predefined blocks of difference values from a set of plural predefined reference difference value blocks, the determined one or more predefined blocks of difference values representing a full resolution set of difference data, the full resolution set of difference data representing a difference between:
(i) an upscaled version of the determined lower resolution version of the set of texture data elements; and
(ii) the set of texture data elements; and the method further comprising:
encoding by processing circuitry the set of texture data elements as one or more encoded blocks of texture data representing the texture data elements of the set of texture data elements, each such encoded block of texture data:
encoding a sub-set of texture data elements from the set of texture data elements and including:
data indicating a base data value for the respective sub-set of texture data elements taken from the determined lower resolution version of the set of texture data elements; and
an index value or values indicating a predefined block or blocks of difference values from the determined one or more predefined blocks of difference values representing the full resolution set of difference data representing the difference between: (i) the upscaled version of the determined lower resolution version of the set of texture data elements, and (ii) the set of texture data elements, the indicated predefined block or blocks of difference values to be used when decoding the encoded block of texture data to generate the data values to be used for the respective sub-set of texture data elements that the encoded block of texture data encodes; and
storing by processing circuitry the one or more encoded blocks of texture data in memory for use by the graphics processing system.

2. The method of claim 1, wherein the data that is included in each encoded block of texture data for indicating a base data value for the respective sub-set of texture data elements taken from the determined lower resolution version of the set of texture data elements comprises a data value taken directly from the determined lower resolution version of the set of texture data elements.

3. The method of claim 1, wherein the determined one or more predefined blocks of difference values each comprise a respective single difference data value for each respective texture data element of a block of the set of texture data elements, which single difference data value is to be used for all the components of the texture data element.

4. The method of claim 1, wherein the index values indicate a base index into the set of predefined reference difference value blocks, and the index values indicate one or more of: an orientation to be used for a block of the set of predefined reference difference value blocks indexed by the base index; whether a sign of the indexed block's values is to be negated or not; and whether the indexed block's values should be multiplied by a scaling factor or not.

5. The method of claim 1, comprising using by processing circuitry two sets of encoded blocks of texture data in combination to encode a set of texture data elements.

6. A method of graphics processing, the method comprising:
decoding an encoded block of texture data that encodes a sub-set of a set of texture data elements used in a graphics processing system to determine a value of a texture data element that the encoded block of texture data encodes by:
determining by processing circuitry from the encoded block of texture data a base data value for the sub-set of texture data elements that the encoded block of texture data encodes taken from a lower resolution version of the set of texture data elements, and using by processing circuitry the determined base data value for the sub-set of texture data elements that the encoded block of texture data encodes to determine a base data value to be used for the texture data element that the encoded block of texture data encodes whose value is to be determined;
determining by processing circuitry from the encoded block of texture data a difference data value to be used when decoding the encoded block of texture data to generate the data value to be used for the texture data element that the encoded block of texture data encodes whose value is to be determined by:
identifying in the encoded block of texture data that encodes the texture data element, based on the position of the texture data element, an index value indicating a predefined block of difference values from one or more predefined blocks of difference values determined from a set of plural predefined reference difference value blocks, the determined one or more predefined blocks of difference values representing a full resolution set of difference data, the full resolution set of difference data representing a difference between:
(i) an upscaled version of the lower resolution version of the set of texture data elements; and
(ii) the set of texture data elements;
using the index value to fetch the predefined block of difference values indicated by the index value from memory; and
determining the difference data value from the predefined block of difference values indicated by the index value to use for the texture data element based on the position of the texture data element; and
using by processing circuitry the determined base data value for the texture data element together with the determined difference data value for the texture data element to generate the data value to be used for the texture data element; the method further comprising:
the graphics processing system using the data value for the texture data element determined from the encoded block of texture data to perform a graphics processing operation.

7. The method of claim 6, comprising determining by processing circuitry the base data value to be used for the texture data element whose value is to be determined using:
the determined base data value for the sub-set of texture data elements that the encoded block of texture data encodes, and a base data value or values determined from one or more other encoded blocks of texture data representing the set of texture data elements.

8. The method of claim 6, further comprising:
determining by processing circuitry from the index value whether any manipulations need to be applied to the predefined block of difference values and, if so, applying by processing circuitry those manipulations to the predefined block of difference values; and identifying by processing circuitry the difference data value to use for the texture data element from the predefined block of difference values to which those manipulations have been applied based on the position of the texture data element.

9. An apparatus for encoding a set of texture data elements used in a graphics processing system, the apparatus comprising:
processing circuitry that determines a lower resolution version of the set of texture data elements;
processing circuitry that determines one or more predefined blocks of difference values from a set of plural predefined reference difference value blocks, the determined one or more predefined blocks of difference values representing a full resolution set of difference data, the full resolution set of difference data representing a difference between:
(i) an upscaled version of the determined lower resolution version of the set of texture data elements; and
(ii) the set of texture data elements; and the apparatus further comprising:
processing circuitry that encodes the set of texture data elements as one or more encoded blocks of texture data representing the texture data elements of the set of texture data elements, each such encoded block of texture data:
encoding a sub-set of texture data elements from the set of texture data elements and including:
data indicating a base data value for the respective sub-set of texture data elements taken from the determined lower resolution version of the set of texture data elements; and
an index value or values indicating a predefined block or blocks of difference values from the determined one or more predefined blocks of difference values representing the full resolution set of difference data representing the difference between: (i) the upscaled version of the determined lower resolution version of the set of texture data elements, and (ii) the set of texture data elements, the indicated predefined block or blocks of difference values to be used when decoding the encoded block of texture data to generate the data values to be used for the respective sub-set of texture data elements that the encoded block of texture data encodes; and
processing circuitry that stores the one or more encoded blocks of texture data in memory for use by the graphics processing system.

10. The apparatus of claim 9, wherein the data that is included in each encoded block of texture data for indicating a base data value for the respective sub-set of texture data elements taken from the determined lower resolution version of the set of texture data elements comprises a data value taken directly from the determined lower resolution version of the set of texture data elements.

11. The apparatus of claim 9, wherein the determined one or more predefined blocks of difference values each comprise a respective single difference data value for each respective texture data element of a block of the set of texture data elements, which single difference data value is to be used for all the components of the texture data element.

12. The apparatus of claim 9, wherein the index values indicate a base index into the set of predefined reference difference value blocks, and the index values indicate one or more of: an orientation to be used for a block of the set of predefined reference difference value blocks indexed by the base index; whether a sign of the indexed block's values is to be negated or not; and whether the indexed block's values should be multiplied by a scaling factor or not.

13. An apparatus for graphics processing, the apparatus comprising:
processing circuitry for decoding an encoded block of texture data that encodes a sub-set of a set of texture data elements to be used by a graphics processor to determine a value of a texture data element that the encoded block of texture data encodes, the processing circuitry comprising:
processing circuitry that determines from an encoded block of texture data a base data value for the sub-set of texture data elements that the encoded block of texture data encodes taken from a lower resolution version of the set of texture data elements, and that uses the determined base data value for the sub-set of texture data elements that the encoded block of texture data encodes to determine a base data value to be used for a texture data element that the encoded block of texture data encodes whose value is to be determined;
processing circuitry that determines from an encoded block of texture data a difference data value to be used when decoding the encoded block of texture data to generate the data value to be used for a texture data element that the encoded block of texture data encodes whose value is to be determined by:
identifying in the encoded block of texture data that encodes the texture data element, based on the position of the texture data element, an index value indicating a predefined block of difference values from one or more predefined blocks of difference values determined from a set of plural predefined reference difference value blocks, the determined one or more predefined blocks of difference values representing a full resolution set of difference data, the full resolution set of difference data representing a difference between:
(i) an upscaled version of the lower resolution version of the set of texture data elements; and
(ii) the set of texture data elements;
using the index value to fetch the predefined block of difference values indicated by the index value from memory; and
determining the difference data value from the predefined block of difference values indicated by the index value to use for the texture data element based on the position of the texture data element; and
processing circuitry that uses a determined base data value for a texture data element together with a determined difference data value for the texture data element to generate a data value to be used for the texture data element;
wherein the apparatus comprises a graphics processor that uses the data value for the texture data element determined from the encoded block of texture data to perform a graphics processing operation.

14. The apparatus of claim 13, wherein the processing circuitry that determines the base data value to be used for the texture data element whose value is to be determined determines the base data value to be used for the texture data element whose value is to be determined using:
the determined base data value for the sub-set of texture data elements that the encoded block of texture data encodes, and a base data value or values determined from one or more other encoded blocks of texture data representing the set of texture data elements.

15. The apparatus of claim 13, further comprising:
processing circuitry that determines from the index value whether any manipulations need to be applied to the predefined block of difference values and, if so, applies those manipulations to the predefined block of difference values; and
processing circuitry that identifies the difference data value to use for the texture data element from the predefined block of difference values to which those manipulations have been applied based on the position of the texture data element.

16. A non-transitory computer readable storage medium storing computer software code which when executing on a processor performs a method of encoding a set of texture data elements used in a graphics processing system, the method comprising:
determining by processing circuitry a lower resolution version of the set of texture data elements;
determining by processing circuitry one or more predefined blocks of difference values from a set of plural predefined reference difference value blocks, the determined one or more predefined blocks of difference values representing a full resolution set of difference data, the full resolution set of difference data representing a difference between:
(i) an upscaled version of the determined lower resolution version of the set of texture data elements; and
(ii) the set of texture data elements; and the method further comprising:
encoding by processing circuitry the set of texture data elements as one or more encoded blocks of texture data representing the texture data elements of the set of texture data elements, each such encoded block of texture data:
encoding a sub-set of texture data elements from the set of texture data elements and including:
data indicating a base data value for the respective sub-set of texture data elements taken from the determined lower resolution version of the set of texture data elements; and
an index value or values indicating a predefined block or blocks of difference values from the determined one or more predefined blocks of difference values representing the full resolution set of difference data representing the difference between: (i) the upscaled version of the determined lower resolution version of the set of texture data elements, and (ii) the set of texture data elements, the indicated predefined block or blocks of difference values to be used when decoding the encoded block of texture data to generate the data values to be used for the respective sub-set of texture data elements that the encoded block of texture data encodes; and
storing by processing circuitry the one or more encoded blocks of texture data in memory for use by the graphics processing system.

* * * * *